United States Patent [19]

Peters et al.

[11] Patent Number: 5,379,378
[45] Date of Patent: Jan. 3, 1995

[54] DATA PROCESSING SYSTEM HAVING A BUS COMMAND GENERATED BY ONE SUBSYSTEM ON BEHALF OF ANOTHER SUBSYSTEM

[75] Inventors: Arthur Peters, Lawrence; Richard C. Zelley, North Chelmsford; Elmer W. Carroll, Billerica; George J. Barlow, Tewksbury; Chester M. Nibby, Jr., Beverly, all of Mass.; James W. Keeley, Nashua, N.H.

[73] Assignee: Bull HN Information Systems Inc., Billerica, Mass.

[21] Appl. No.: 773,752

[22] Filed: Oct. 10, 1991

Related U.S. Application Data

[63] Continuation of Ser. No. 547,527, Jun. 29, 1990, abandoned, which is a continuation of Ser. No. 944,052, Dec. 18, 1986, abandoned.

[51] Int. Cl.[6] .............................................. G06F 15/16
[52] U.S. Cl. ...................................... 395/200; 395/325; 395/425
[58] Field of Search ..................... 395/200, 325, 425

[56] References Cited

U.S. PATENT DOCUMENTS

| | | |
|---|---|---|
| 3,993,981 | 11/1976 | Cassarino, Jr. et al. ......... 340/172.5 |
| 4,030,075 | 6/1977 | Barlow ................................. 395/325 |
| 4,093,981 | 6/1978 | McAllister et al. ................. 364/200 |
| 4,181,974 | 1/1980 | Lemay et al. ....................... 364/900 |
| 4,371,928 | 2/1983 | Barlow et al. ...................... 364/200 |
| 4,385,351 | 5/1983 | Matsuura et al. .................. 364/200 |
| 4,418,382 | 11/1983 | Larson et al. ..................... 364/200 |
| 4,426,679 | 1/1984 | Yu et al. ............................. 364/200 |
| 4,635,189 | 1/1987 | Kendall .............................. 364/200 |
| 4,639,860 | 1/1987 | Peters ................................. 364/200 |
| 4,674,037 | 6/1987 | Funabashi et al. ................ 364/200 |

OTHER PUBLICATIONS

J. Rosenberg, Dictionary of Computers, Information Processing and Telecommunications, Second Edition, 1987, p. 65.

Primary Examiner—Mark K. Zimmerman
Attorney, Agent, or Firm—Lewis P. Elbinger; John S. Solakian

[57] ABSTRACT

A data processing system includes a system management unit, a number of central subsystems, a main memory and a number of peripheral subsystems all coupled in common to a system bus. Any subsystem may generate a command which includes a first field specifying a destination subsystem, a second field specifying the operation the destination subsystem is to perform. If a response is required, the subsystem generating the initial command may specify a third subsystem for receiving the response command.

10 Claims, 13 Drawing Sheets

\* BIT 18 = 0 ACCESS SYSTEM BUS INTERFACE
   = 1 ACCESS CPU

\*\* DATA BIT 10 IS RETURNED IN SHBC
    AS ADDRESS BIT 18 (DATA BIT 10 = 0)

DATA PROCESSING SYSTEM HAVING A BUS COMMAND GENERATED BY ONE SUBSYSTEM ON BEHALF OF ANOTHER SUBSYSTEM

This application is a continuation of application Ser. No. 07/547,527, filed Jun. 29, 1990 which is a continuation of Ser. No. 06/944,052, filed Dec. 18, 1986, both now abandoned.

RELATED APPLICATIONS

The following patent applications which are assigned to the same assignee as the instant application have been filed on an even date with the instant application, have related subject matter. Certain portions of the system and processes herein disclosed are not our invention, but are the invention of the below named inventors as defined by the claims in the following patent applications:

1. Apparatus and Method of Loading A Control Store Memory of a Central Subsystem, invented by Richard C. Zelley, Mark J. Kenna, Jr. , and Wallace A. Martland, Ser. No. 943,980.
2. Apparatus for Loading and Verifying a Control Store Memory of a Central Subsystem, invented by Chester M. Nibby, Jr., Richard C. Zelley, Kenneth E. Bruce, George J. Barlow and James W. Keeley, Ser. No. 943,984.
3. Apparatus and Method of Loading Different Control Stores of a Multiprocessor to Provide a Multi-Personality System, invented by Richard C. Zelley, Mark J. Kenna, Jr., and Wallace A. Martland, Ser. No. 943,985.

The following patent applications are assigned to the same assignee and are related to the instant application:

1. Universal Peripheral Controller Self-Configuring Bootloadable Ramware, invented by John A. Klashka, Sidney L. Kaufman, Krzysztof A. Kowal, Richard P. Lewis, Susan L. Raisbeck and John L. McNamara Jr., Ser. No. 925,431, Filed Oct. 31, 1986.
2. System Management Apparatus for a Multiprocessor System, invented by George J. Barlow, Elmer W. Carroll, James W. Keeley, Wallace A. Martland, Victor M. Morganti, Arthur Peters and Richard C. Zelley, Ser. No. 869,164, Filed May 30, 1986.

BACKGROUND OF THE INVENTION

1. Field of the Invention

This invention relates to data processing systems and more particularly to the use of commands on a system bus which are sent by one subsystem to tell another subsystem to send a response command to a third subsystem.

2. Description of the Prior Art

U.S. Pat. No. 4,030,075 entitled "Data Processing System Having Distributed Priority Network", invented by George J. Barlow, describes a data processing system in which a number of subsystems are coupled in common by a system bus. The subsystems communicate with each other by sending commands out on the system bus. A command may include a channel number identifying a receiving unit, a channel number identifying a sending subsystem and a function code specifying an operation to be performed by the receiving subsystem. The function code may require that the receiving subsystem generate a response command. This response or second half bus cycle command includes the channel number identifying the sending subsystem. The sending subsystem responds to its channel number and acknowledges the receiving of the second half bus cycle command.

OBJECTS OF THE INVENTION

It is an object of the invention to have an improved data processing system.

It is another object of the invention to have an improved data processing system wherein all subsystems are coupled in common to a system bus.

It is a further object of the invention to have a data processing system with a more versatile command system for transmitting commands over the system bus.

SUMMARY OF THE INVENTION

A main memory, a central subsystem (CSS) and a system management facility (SMF) are all coupled in common to a system bus. The SMF may send a memory reference read command to main memory and receive the contents of the location specified by the command. The command includes an address in main memory and a channel number of the SMF. This enables the main memory to include the SMF channel number in the second half bus cycle command sending the data to the SMF from main memory.

However the SMF may send the memory reference read command which includes the channel number of a port of the CSS as the sending unit. Main memory will send the second half bus cycle command containing the addressed data word to the CSS. The SMF includes apparatus for resetting the read command when it receives the acknowledge signal from main memory indicating that the command was received. Normal operation is for the sending unit to keep the read command logic active until the second half bus cycle command is received by the sending unit.

DESCRIPTION OF THE PREFERRED EMBODIMENT

Figure 1:
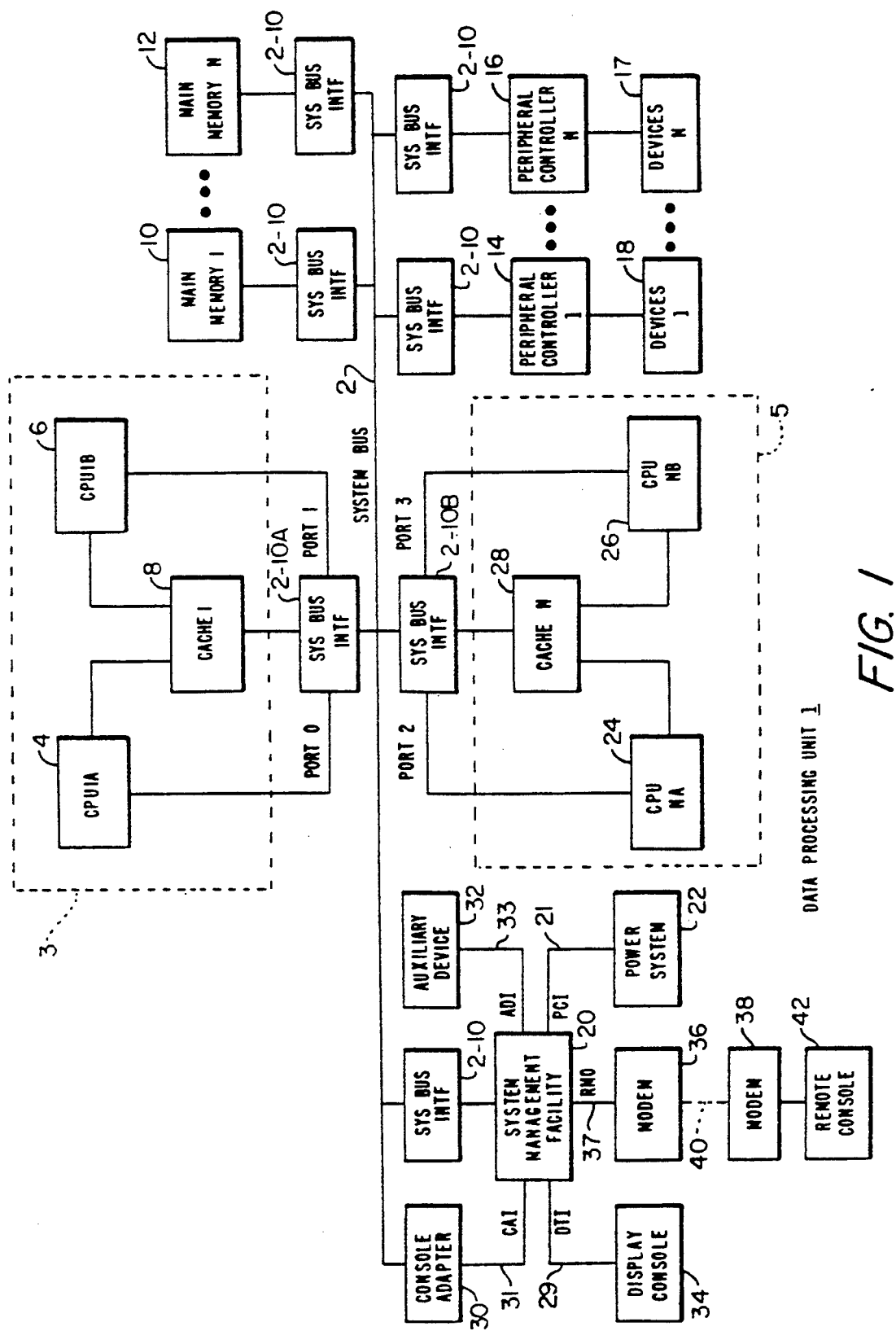
FIG. 1 shows a block diagram of the data processing system.

FIG. 1 shows a tightly coupled multiprocessor data processing unit (DPU) 1 which includes a plurality of central subsystems (CSS) 3 through 5 coupled to a system bus interface 2-10A and 2-10B respectively; and a plurality of main memories 10 through 12, a plurality of peripheral controllers 14 through 16 and a system management facility (SMF) 20, all coupled in common to a system bus 2 via their respective system bus interface 2-10.

A plurality of devices 1 18 are coupled to peripheral controller 1 14 and a plurality of devices N 17 are coupled to peripheral controller N 16. The plurality of peripheral controllers 14 through 16 may include disk controllers, tape controllers, communication controllers and unit record controllers to which are coupled their respective disk drives, tape devices, communication lines, and unit record devices.

The organization of each of the plurality of CSS 3 through CSS 5 is the same. CSS 3 includes a central processor unit (CPU1A 4 and a CPU1B 6) both operating independently of each other with a cache 1 8 which is coupled to system bus 2. CSS 5 includes a CPUNA 24 and a CPUNB 26 both operating independently of each other with a cache N 28 which is coupled to system bus 2. CPUNA 24 and CPUNB 26 access main memory 10 through main memory 12 via cache N 28. CSS 3 through CSS 5 operate as tightly coupled multiprocessors since they execute a common operating system and share a common main memory.

Note that CPU1A 4 and CPU1B 6 are identified hereafter as CPU 4 and CPU 6. Similarly, CPUNA 24 and CPUNB 26 are identified as CPU 24 and CPU 26. A port 0 and a port 1 couple CPU 4 and CPU 6 respectively to interface 2-10A, and a port 2 and a port 3 couple CPU 24 and CPU 26 respectively to interface 2-10B.

The SMF 20 provides for centralized control of DPU 1. This centralized control includes the initialization of the overall DPU 1 system, centralized control of the Quality Logic Test (QLT) operation, system timer centralization, and providing power supply and cabinet temperature alerts to the subsystems coupled to system bus 2. A number of control signals are provided between a power system 22 and SMF 20 via a power control interface (PCI) 21. Control signals from the power system 22 indicate to the SMF 20 the status of the DPU 1 power. Control signals from the SMF 20 to the power system 22 over PCI 21 specify the prescribed voltage margins at which the power system 22 should operate in order to test the DPU 1. The SMF 20 will run the QLT operation at the prescribed voltage margins to isolate and identify marginal logic elements.

A display console 34 allows an operator to communicate with DPU 1 via a display terminal interface (DTI) 29 to SMF 20. SMF 20 receives information from display console 34 and applies it to a system bus 2 via a console adapter interface (CAI) 31 and a console adapter 30. Information from DPU 1 is received by the display console 34 via system bus 2, console adapter 30, CAI 31, SMF 20 and DTI 29. Display console 34 is typically a Honeywell VIP 7300 terminal having a manual keyboard and a cathode ray tube (CRT) display. The CAI 31 and DTI 29 are typically RS232 or RS422 communication interfaces.

The SMF 20 supports a remote maintenance capability. A remote console 42 may be an operator controlled display terminal or an unattended computer. The remote console 42 is connected to the SMF 20 via a MODEM 38, a communication line 40, a MODEM 36, and a remote maintenance option interface (RMO) 37. MODEMS 36 and 38 are typically RIXON MODEMS, for example, a T113C MODEM which originates calls at 300 baud, a T103J MODEM which originates and answers calls at 300 baud, and a T212A MODEM which originates and answers calls at 1200 baud.

The remote maintenance operation allows the remote site to resolve software and operational faults, to identify hardware faults, to send information such as software patches to the central DPU 1 system, and to provide back-up assistance to the on-site maintenance operation.

The SMF 20 will give access to the remote site access to the DPU 1 through SMF 20 to provide centralized control only if the proper password is received by the SMF 20.

An auxiliary device interface (ADI) 33, typically an RS232C interface, connects an auxiliary device 32 to the SMF 20. The auxiliary device 32 is typically a printer for logging status information or providing hard copy of the information displayed on the CRT of display console 34.

The SMF 20 during the DPU 1 start-up will initiate quality logic tests (QLT's) to assure that all the subsystems are coupled to the system bus 2 and are performing correctly. If the tests are unsuccessful, the SMF 20 signals power system 22 via PCI 21 to indicate the condition and also displays the error on the display console 34, remote console 42 and auxiliary device 32.

All of the subsystems bid for access to system bus 2 with the highest priority subsystem bidding gaining the access. Due to the requirement that the SMF 20 react quickly to certain real time system conditions, such as power fail detection, the SMF 20 is afforded highest priority to access system bus 2.

Figure 2A:
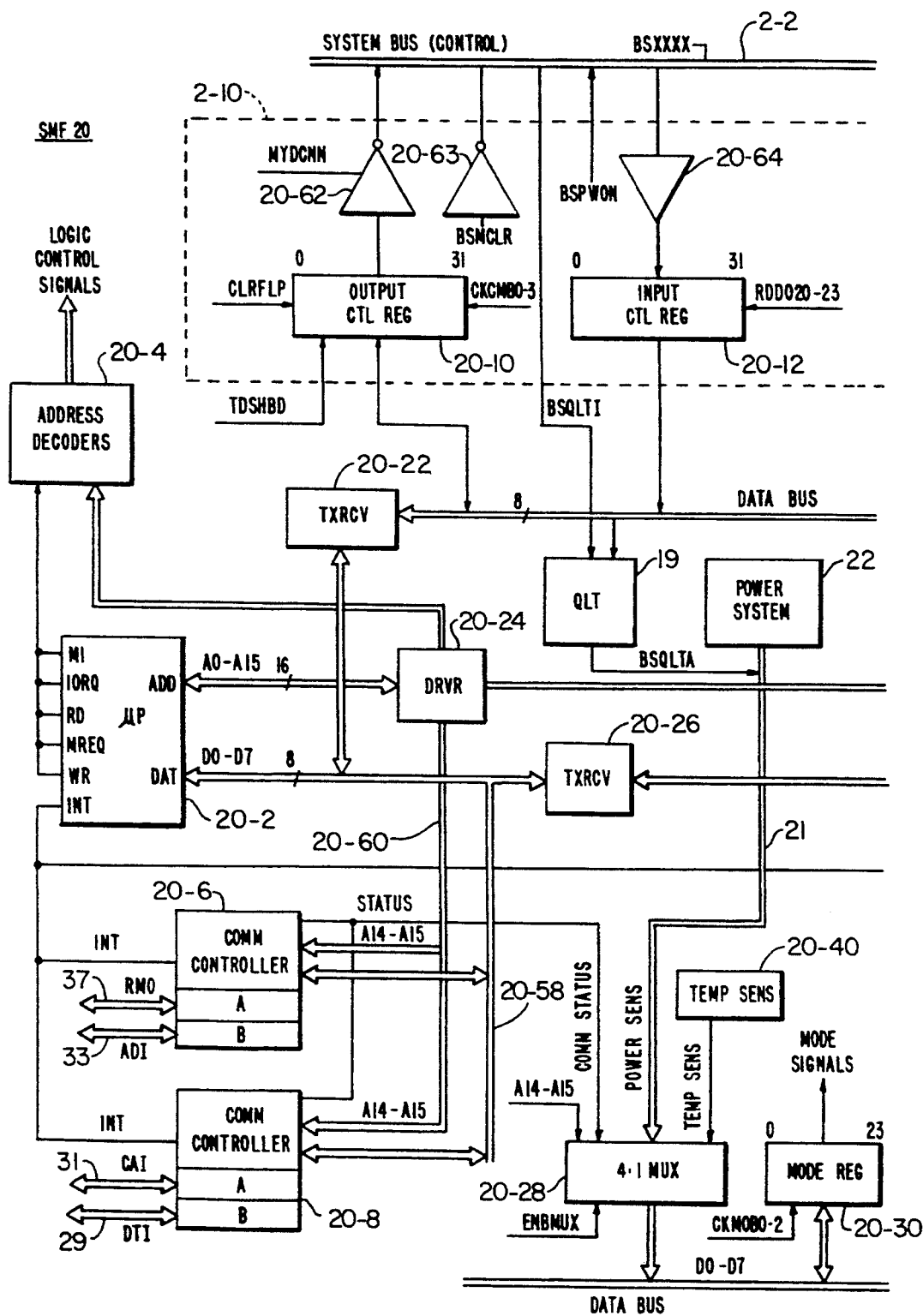
FIGS. 2A and 2B (hereinafter FIG. 2) show a block diagram of the systems management facility.
Figure 2B:
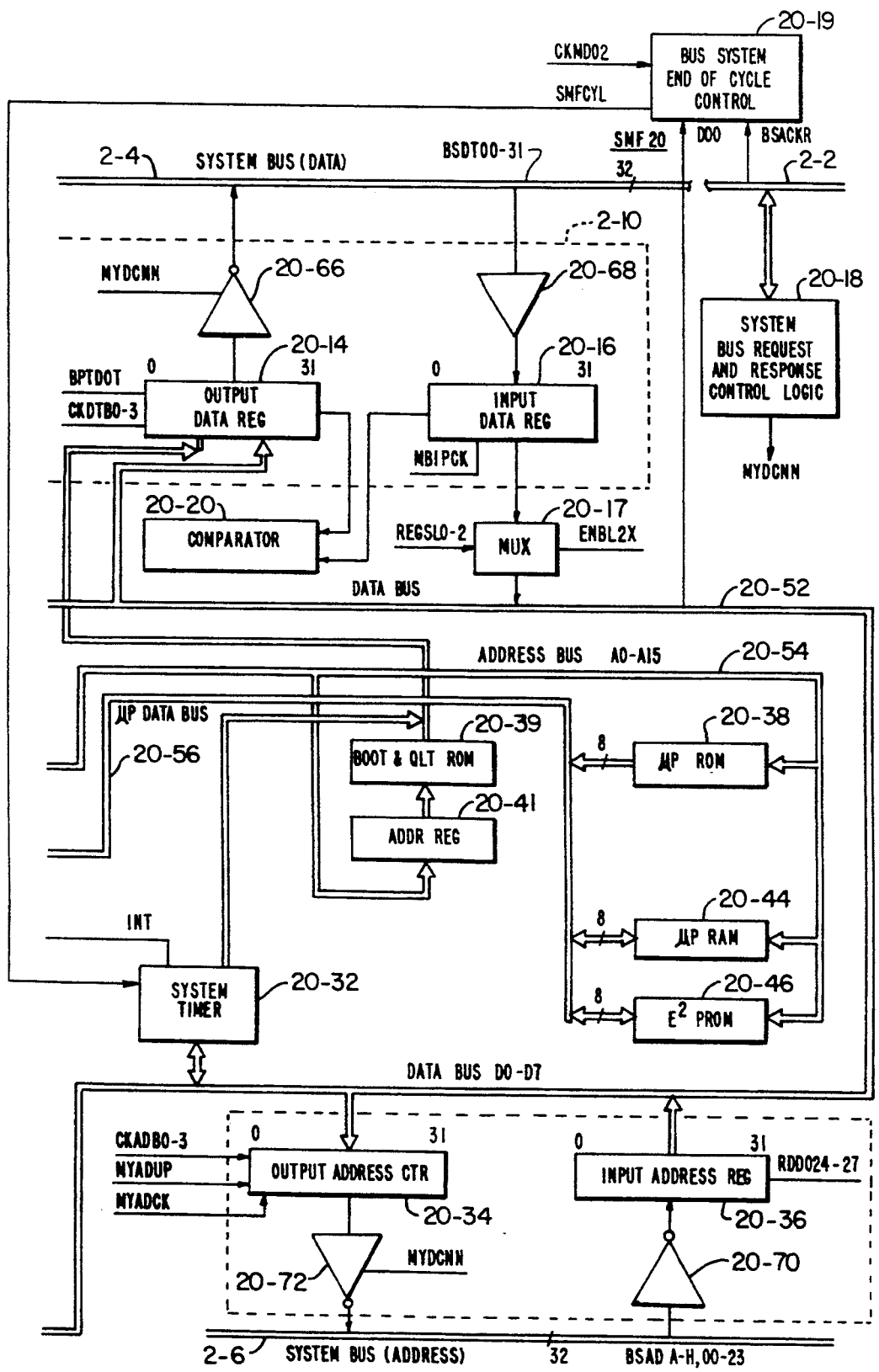

FIG. 2 is a block diagram showing SMF 20 coupled to system bus 2. System bus 2 is shown as system bus (control) 2-2, system bus (data) 2-4 and system bus (address) 2-6. The system bus interface 2-10 generally operates as disclosed in U.S. Pat. No. 3,995,258 entitled, "Data Processing System Having a Data Integrity Technique", invented by George J. Barlow.

A microprocessor 20-2 controls the SMF 20/system bus 2 interface via software routines stored in a microprocessor random access memory (RAM) 20-44. Microprocessor 20-2 is a Zilog Z80 CPU described in the Zilog Gold Book 1983/1984 Components Data Book, Volume 3, 10th Edition. The microprocessor 20-2 is itself controlled by software stored in a microprocessor programmable read only memory (PROM) 20-38. Both the RAM 20-44 and the PROM 20-38 receive address signals A0 through A15 from microprocessor 20-2 over a 16 bit microprocessor address bus 20-54 via a driver 20-24. Data signals D0 through D7 are transferred between RAM 20-44 and microprocessor 20-2, and from PROM 20-38 via an 8-bit microprocessor data bus 20-56 and a transceiver 20-26.

When the SMF 20 has access to system bus 2, thirty-two data signals BSDT00-31 may be received by receivers 20-68 and stored in an input data register 20-16 from system data bus 2-4. Under microprocessor 20-2 control, the data is read from register 20-16 and stored in a location in RAM 20-44, 8 bits at a time via a multiplexer (MUX) 20-17, a data bus 20-52, a transceiver 20-22, transceiver 20-26 and data bus 20-56. Thirty-two address signals BSAD A-H, 00-23 are received from system address bus 2-6 by receivers 20-70 and an input address register 20-36 and stored in locations in RAM 20-44, 8 bits at a time under microprocessor 20-2 control, and thirty-two control signals are received from system control bus 2-2 by receivers 20-64 and an input control register 20-12 and stored in locations in RAM 20-44, 8 bits at a time, in a similar manner as the data signals. Microprocessor 20-2 identifies the input registers 20-36, 20-16 and 20-12 as locations in RAM 20-44 and sends the appropriate address to RAM 20-44 via driver 20-24 and address bus 20-54.

Microprocessor 20-2 inititates the loading of data signals BSDT00-31 into a 32 bit output data register 20-14 by addressing corresponding locations in RAM 20-44 and reading out data, 8 bits at a time. A 32 bit output address counter 20-34 is loaded with address signals BSAD00-31 by microprocessor 20-2 addressing corresponding locations in RAM 20-44 and reading out the address signals, 8 bits at a time. Similarly, a 32 bit output control register 20-10 is loaded with bus control information by microprocessor 20-2 addressing corresponding locations in RAM 20-44 and reading out control information, 8 bits at a time.

A boot and QLT ROM 20-39 stores test patterns and software test routines which are written into main memory 10 through 12. CSS 3 through 5 accesses these test patterns and software test routines to verify that the CSS 3 through 5 is operative. The ROM 20-39 is loaded directly into the output data register 20-14 under microprocessor 20-2 control. When the SMF 20 bids for and gains access to system bus 2, the information stored in output data register 20-14, output control register 20-10 and output address counter 20-34 is transferred to system bus 2 by drivers 20-66, 20-62 and 20-72 which are enabled by a my data cycle now signal MYDCNN.

System timers 20-32 provides centralized timing control of all subsystems and includes a real time clock, a watch dog timer and a time of day clock and a number of time outs.

The real time clock is loaded by a command from any CPU 4 through CPU 26 of CSS 3 through 5 with a value equal to the difference between the current time of day and the startup time of the process at the top of the Real Time Queue. When the current time of day equals the startup time, a real time clock interrupt signal is generated. This signal causes the SMF 20 to generate a command to interrupt the CPU which loaded the real time clock to alert the operating system to start the process at the top of the queue and to reload the real time clock for the next process. The maximum time span is approximately 8.4 seconds.

The watch dog timer is used to protect the DPU 1 against certain software malfunctions which are manifested by a process running "too long". A command from any CPU 4 through CPU 26 loads the decrementing watch dog timer with a predetermined time. If the watch dog timer is not reloaded before it decrements to zero, an interrupt signal is generated causing the SMF 20 to generate a command to the CPU 4 through CPU 26 to alert the operating system that some process may be stuck in an infinite loop. The maximum time span is approximately 8.95 seconds.

The time of day clock is loaded from a battery backed-up real time calender and is incremented once every microsecond. The real time calendar stores in 12 binary coded decimal digits, the current year, current month, current date, hour, minute and second.

The SMF 20 may operate as a master or a slave on system bus 2 operations. SMF 20 acts as a master when it initiates and sends commands to the other subsystems coupled to system bus 2. As a master, the SMF initiates general commands on system bus 2 to any subsystem and initiates special commands to CPU 4 through CPU 26.

SMF 20 acts as a slave when it receives an unsolicited command from any CPU 4 through CPU 26, and also when it receives an expected response from any of the other subsystems coupled to system bus 2.

SMF acts as both a master and a slave during a system bus 2 wraparound test operation wherein SMF 20 sends data out on system bus 2 as a master and receives the same data from system bus 2 a a slave. Referring to FIG. 2, during the wraparound test operation, 32 bits of data are loaded into output data register 20-14 from RAM 20-44. SMF 20 then issues a non memory system bus 2 request to itself. SMF 20 will recognize this request and connect to system bus 2 to transfer the contents of the output data register 20-14 to the input data register 20-16 via drivers 20-66, system data bus 2-4 and receivers 20-68. A comparator 20-20 checks that the contents of the two registers 20-14 and 20-16 are equal for correct operation.

SMF 20 generates commands to the other subsystems coupled to system bus 2 as standard commands with bus control signal BSYELO low. SMF 20 generates special commands to CPU1A 4 through CPUNB 26, with bus control signal BSYELO high and control signal BSMREF low indicating that the address signals represent a CPU channel address and a function code and not a memory 10 through 12 address.

System bus request and response control 20-18 includes three time-out circuits. If SMF 20 as the master requests access to system bus 2 and three microseconds pass with no response from the requested subsystem, the slave, then the system bus 2 cycle is terminated.

If one of the other subsystems as the master requests access to system bus 2 and there is no response from the slave within 5 microseconds, then the system bus 2 cycle is terminated.

If an SMF 20 read cycle is initiated and an expected system bus 2 reponse cycle (second half bus cycle) is not received in a millisecond, then the system bus 2 operation is terminated.

When the SMF 20 responds to a system bus 2 request as a slave, the SMF 20 generates either bus signals BSACKR to acknowledge the request or BSNAKR to refuse th request.

The display console 34 is coupled to a communications controller 20-8 via the DTI interface 29. The communications controller 20-8 is coupled to system bus 2 via interface CAI 31 and the console adapter 30. This arrangement permits the SMF 20 to control the communication between the console and the DPU 1 system.

SMF 20 controls the remote maintenance via interface RMO 37 coupled to a communication controller 20-6. Communication controller 20-6 also controls the auxiliary device 32 via the ADI 33 interface. Communication controllers 20-6 and 20-8 are controlled by address signals A14 and A15 from microprocessor 20-2, driver 20-24 and address bus 20-60. Signal A14 selects channel A or channel B. Signal A15 causes either data or control information to be placed on the data bus 20-58 lines. Data or control information is transferred between microprocessor 20-2 and communication controllers 20-6 and 20-8 and data bus 20-58.

An operator writable $E^2$ PROM 20-46 stores information which includes a password to prevent unauthorized access via the remote maintenance interface; identifies the device storing boot software and also the main memory 10 through 12 locations into which the boot software is written for execution; control bits to indicate different QLT test functions to be performed by the DPU 1 system, and identifies which peripheral device stores the software to control CSS 3 through 5 and the main memory 10 through 12 locations into which this software is written.

A mode register 20-30 is coupled to data bus 20-52 and performs the following functions:
1. defines the SMF 20 diagnostic control of system bus 2 priority bits;
2. controls the up/down counting of output address counter 20-34;
3. enables comparator 20-20 to perform data system bus 2-4 comparisons;
4. control SMF 20 responses to CSS 3 through 5 commands; and
5. controls special system bus 2 operations during QLT and power up initialization.

Mode register 20-30 is written into and read by microprocessor 20-2 via transceiver 20-22 and data bus 20-52.

The mode register 20-30 is enabled by signal ENBLIX whose boolean equation is $$\overline{A8}.\overline{A9}.\overline{A10}.\overline{A11}.\overline{A0}.\overline{A1}.\overline{A2}.\overline{A3}.\overline{A4}.\overline{MI}.\overline{MREQ}.$$

The mode register 20-30 clocking signals CKMDB0-2 are generated by the Boolean expression $$\overline{ENBLIX}.\overline{A12}.\overline{WR}.\overline{A13}.(\overline{A14}.\overline{A15}).$$

(For CKMDB0, A14.A15; for CKMDB1, A15.$\overline{A14}$, and for CKMDB2, $\overline{A14}$.A15.

The power system 22 interface PCI 21 signals are received by SMF 20. These signals indicate a number of conditions.

A power ON/Fail signal SYSPWN indicates to the SMF 20 that the AC input voltage and the output logic voltages are within specifications. SMF 20 then starts the DPU 1 system intialization operations. If AC power is removed, the Power ON/Fail signal SYSPWN goes low. The output logic voltage, however, will remain within specification for three milliseconds giving the DPU 1 system time the shut down in an orderly manner to avoid losing data.

A power status signal PWRYLO indicates that all power supplies are performing to specification. The power status signal going low indicates a non-operative power supply.

Power system 22 may include a battery backup power supply to keep the data in main memory 10 through 12 valid at all times. A memory valid signal BBUATV, if low, indicates that despite the battery backup power, the memory voltage went low and the information in main memory 10 through 12 may not be valid and memory reload is initiated.

A keylock signal from a switch on the power system 22 control panel initiates a panel locked signal to control an operator's access to the DPU 1 system functionality.

These signals received by the SMF 20 from the PCI 21 interface are applied to a multiplexer 20-28. Microprocessor 20-2 receives these signals via data bus 20-52 and tranceiver 20-22 to take appropriate action.

SMF 20 sends a power-on signal BSPWON out on system bus 2 to indicate to all subsystems coupled to the system bus 2 that power is within specification. Signal BSPWON going off gives all of the subsystems 3 milliseconds to "tidy up".

Also, the power on/fail signal SYSPWN going high during Power-On forces a master clear signal BSMCLR over system bus 2 via a driver 20-63 to reset all appropriate logic functions.

SMF 20 sends a number of signals to power system 22 over the PCI 21 interface. A high voltage output margin control signal HIMARG, and a low voltage output margin control signal LOMARG are generated by microprocessor 20-2 during test operations to vary the output margins on all power subsystems ±2%.

A system bus signal BSQLTI indicates that all other subsystems coupled to the system bus 2 are attached correctly, powered up and have successfully completed all test programs (QLT's). QLT logic 19 receives bus signal BSQLTI and a data signal from data bus 20-52 indicating that SMF 20 correctly performed its QLT and generates signal BSQLTA which is sent to power system 22 and interface 21 which indicates that the DPU 1 system is completely checked out. Signal BSQLTA is true whenever any unit is running its QLT or any QLT failure. BSQLTA is false whenever the QLT test is successful.

SMF 20 includes a temperature sensing device 20-40 to monitor the DPU 1 system cabinet temperature and generates a temperature high signal TMPYLO if the cabinet temperature is above the maximum temperature of 38° C. If the cabinet temperature goes abnormally high, a thermal sensor (not shown) will open, shutting down power. This causes the power on/fail signal SYSPWN to generate the system bus 2 signal BSPWON to indicate to all of the subsystems on system bus 2 to go into their respective power down sequences.

The temperature high signal TMPYLO is applied to MUX 20-28 to make it accessible to the microprocessor 20-2.

Signals from the communication controllers 20-6 and 20-8 are also applied to MUX 20-28 to allow the microprocessor 20-2 to sample the transmit data lines and also to detect when the receiving device is ready to receive the data.

MUX 20-28 is enabled by signal ENBMUX which is generated by the following Boolean expression:

$$\overline{ENBMUX} = \overline{A8}.A9.A10.A11.\overline{ENMBOR}.\overline{MI}.\overline{MREQ}$$

wherein $$\overline{ENMBOR} = \overline{A0}.\overline{A1}.A2.\overline{A3}.\overline{A4}.$$

Signal MREQ is generated by microprocessor 20-2 to indicate that the address bus 20-54 does not contain a RAM 20-44 address. Signal MI is generated by microprocessor 20-2 to indicate that this is not an op code fetch operation.

Address bus 20-54 signals A14 and A15 select each of the four MUX 20-28 output signals.

The SMF 20 output registers, output data register 20-14, output control register 20-10 and output address counter 20-34 are coupled to system bus 2 (2-4, 2-2, 2-6) via inverting drivers 20-66, 20-62 and 20-72, respectively.

Data is put into these output registers a byte at a time from data bus 20-52. These output registers are addressed by microprocessor 20-2 as RAM 20-44 locations. Output data register 20-14 may also be loaded broadside from the system timer 20-32 or the Boot and QLT ROM 20-39. Also, an output address registers 20-41 is loaded with successive addresses by microprocessor 20-2 for a block transfer of data to main memory 10 through 12.

Signals for loading the output registers are generated by decoding appropriate address lines and combining them with control signals from microprocessor 20-2. The logic showing the generation and checking of parity is not included in the specification since it is not pertinent to the invention, but it is obvious to one of ordinary skill in the art to undertand that parity is checked after every byte transfer.

The output data register 20-14, not including parity, is made up of typically eight 74LS298 multiplexer registers with the "zero" input coupled to data bus 20-52 and the "one" input coupled to the Boot and QLT ROM 20-39 output. The register 20-14 is loaded by logic in address decoders 20-4 as indicated by the following Boolean expression:

An enable signal
$$ENBLOX = MI.\overline{MREQ}.A0.A1.\overline{A2.A3.A4.A8.A9}.\overline{A10.A11}$$

Note that all of the Boolean expressions in the specification represent the logic of address decoders 20-4. The input signals to the address decoders are the address signals A0 through A15 and the microprocessor 20-2 signals MI, MREQ, IORQ, WR and RD. Address decoders 20-4 generate the logic control signals which control the SMF 20 logic elements.

The multiplexer registers 20-14 are loaded two at a time (a byte at a time) since each multiplexer register stores 4 bits, by clock signals CKDTB0, CKDTB1, CKDTB2 and CKDTB3.

$$CKDTB0 = ENBLOX\ A12\ \overline{A13}\ \overline{A14}\ \overline{A15}$$

$$CKDTB1 = ENBLOX\ A12\ \overline{A13}\ \overline{A14}\ A15$$

$$CKDTB2 = ENBLOX\ A12\ \overline{A13}\ A14\ \overline{A15}$$

$$CKDTB3 = ENBLOX\ A12\ \overline{A13}\ A14\ A15$$

Signal BPTDOT selects the output of ROM 20-39 or the output of system timers 20-32. The Boolean expression for BPTDOT is:

$$(A8.A9.A10.A11.A12.A13.IORQ.\overline{MI} + TODRWST)$$

Microprocessor 20-2 signals indicate the following. $\overline{MI}$ together with $\overline{MREQ}$ indicates that this is not an op code fetch operation. $\overline{MREQ}$ indicates that the address bus does not hold a valid address for a memory read or write operation.

$\overline{RD}$ indicates that microprocessor 20-2 wants to read data from memory or an I/O device. $\overline{WR}$ indicates that the microprocessor 20-2 data bus holds valid data for storage at the addressed memory location or I/O location.

$IORQ.\overline{MI}$ indicates that this isn't an input/output device address nor an op code fetch cycle of microprocessor 20-2. Signal TODRWT indicates a system timer 20-32 time of day transfer to system bus 2 via output data register 20-14.

For the broadside loading of output data register 20-14, a signal MYDTCK from system timer 20-32 indicating a time of day transfer or a microprocessor 20-2 generated signal BP2MDT generates clock signals CKDTB0 through CKDTB3 in parallel.

The Boolean expression for signal BP2MDT is:

$$(A8.A9.A10.A11.A12.A13.IORQ.\overline{MI})$$

The output control register 20-10 is made up of typically two 74LS273 registers, a 74LS174 register and a 74LS374 register, all coupled to 8 bit data bus 20-52. The control signals are, clocked into the registers by signals CKCMB0 through CKCMB3, respectively. The Boolean expressions are:

$$CKCMB0 = ENBLOX\ \overline{A12}.\overline{A13}.\overline{A14}.\overline{A15}$$

$$CKCMB1 = ENBLOX\ \overline{A12}.\overline{A13}.\overline{A14}.A15$$

$$CKCMB2 = ENBLOX\ \overline{A12}.\overline{A13}.A14.\overline{A15}$$

$$CKCMB3 = ENBLOX\ \overline{A12}.\overline{A13}.A14.A15$$

A signal TDSHBD disables the output of the 74LS374 register clocked by signal CKCMB0 during a time of day clock transfer. System reset signal CLRFLP resets the remaining three registers.

The 74LS374 register stores the eight command signals shown in FIGS. 5A–5E. They are signals BSYELO, BSBYTE, BSDBPL, BSDBWD, BSSHBC, BSLOCK, BSWRIT and BSMREF. During the non time of day transfer, these bus signals are applied directly to driver 20-62.

The output address counter 20-34 includes four 74AS869 counters described in the Texas Instruments ALS/AS Logic Circuits Data Book 1983 (Advanced Low-Power Schottky/Advanced Schottley). The counters have four modes of operation: clear, decrement, load and increment. A load counter's operation is initated by signal MYADUP applied to the four counters and by signals CKADB0 through CKADB3 applied to the respective counter. The boolean expressions are:

$$CKADB0 = ENBLOX\ \overline{A12}.A13.\overline{A14}.\overline{A15}$$

$$CKADB1 = ENBLOX\ \overline{A12}.A13.\overline{A14}.A15$$

$$CKADB2 = ENBLOX\ \overline{A12}.A13.A14.\overline{A15}$$

$$CKADB3 = ENBLOX\ \overline{A12}.A13.A14.A15$$

Signal MYADUP is stored in the mode register 20-30 by microprocessor 20-2 to indicate a load or increment mode of operation. During a boot and QLT operation, the counters would be loaded initially a byte at a time, and then incremented in sequence with the address register 20-41 reading out the data from ROM 20-39 for transfer to the output data register 20-14.

A clock signal MYADCK is applied to a clock input terminal of each counter 20-34 to time the counter. Signal MYADCK is generated by a delayed acknowledge signal BSACKR.

The input data register 20-16 is made up of four 74S374 registers. The input address register 20-36 is made up of four 74LS374 registers and the input control register 20-12 is made up of two 74LS374 registers, a 74LS374 register and a 74AS823 register. The 74AS823 register receives the eight bus signals BSYELO, BSBYTE, BSDBPL, BSDBWD, BSSHBC, BSLOCK, BSWRIT and BSMREF that control the SMF 20 commands put out on system bus 2.

All of the above input registers 20-16, 20-36 and 20-12 are loaded under control of a clock signal MBIPCK which is generated under three conditions.

1. The system bus request and response control 20-18 acts as a slave and accepts an acknowledge command signal BSACKR or a second half bus cycle command signal BSSHBC from system bus 2.
2. Response control 20-18 detects a 3 microsecond time out during a wrap around test.
3. The SMF 20 acknowledged itself during a test mode.

The thirty-two output data signals from the input data register 20-16 are applied to comparator 20-20 during the wrap around test mode. The data signals are also applied to a MUX 20-17 for transfer to the data bus 20-52 a byte at a time under microprocessor 20-2 control. The outputs of MUX 20-17 are enabled by signal ENBL2X, whose Boolean expression is:

$$A0.\overline{A1}.\overline{A2}.\overline{A3}.\overline{A4}.\overline{A8}.\overline{A9}.\overline{A10}.\overline{A11}.\overline{M1}.MREQ$$

The MUX 20-17 selection is made by signals REGSL0, REGSL1 and REGSL2. The Boolean expressions are:

$$REGSL0=(ENBL2X(A12.A13.\overline{A14}.+A12.\overline{A13}.A15+A12.A14.\overline{A15})+\overline{ENBL2X}.A15)RD$$

$$REGSL1=(ENBL2X(\overline{A12}.A13.A14+A12.A13)+\overline{ENBL2X}.A14)RD$$

$$REGSL2=(ENBL2X(\overline{A12}+A12.A13)+\overline{ENBL2X}.A13)RD$$

The four registers making up the input address register 20-36 have their output signals applied to data bus 20-52 under control of signals RDD024, RDD025, RDD026 and RDD027, respectively. The four registers making up the input control register 20-12 have their output signals applied to data bus 20-52 under control of signals RDD020, RDD021, RDD022 and RDD023, respectively. Signal MBIPCK clocks the address signals into register 20-36.

The Boolean expression for RDD02X where X varies from 0 to 7 is:

$$ENBL2X.RD.A12.A13.A14.A15 \text{ where binary } A13.A14.A15=X$$

The microprocessor 20-2 stores the address bytes, data bytes and command bytes received on the data bus 20-52 into predetermined locations in RAM 20-44 for later action under software control.

The following control signals are used as a part of the commands sent over and received from system bus 2 by SMF 20:

BSYELO (Yellow)

This signal, when true during a second half bus cycle, indicates that the accompanying transferred information has been corrected. It thus designates a soft failure and is taken to mean that perhaps maintenance action should be considered before the failure becomes hard. This signal is used by main memory 10 through 12 on a Read response to indicate an error that was found and corrected.

This signal when true during a memory read request qualifies the read request. The response to BSYELO true during a read request depends on the memory and address involved.

When true during an SMF 20 command to the CSS 3 through 5, BSYELO identifies the SMF 20 command providing BSMREF false indicates that the address leads contain a channel address and a function code.

BSBYTE (Byte)

This signal indicates when true that the current transfer is a byte transfer rather than a word transfer.

BSDBWD (Double Word)

This signal and BSDBPL are used during read requests to indicate how many words of data, and in what format, are expected from main memory 10 through 12. During the read response cycles (from the memory to the requestor), BSDBWD indicates whether or not one or two words of data are on the system bus 2.

On write requests, this signal is used in combination with BSAD23, BSBYTE, and BSDBPL to identify what combination of bytes in a 32-bit operand should be written into memory.

BSDBPL (Double Pull)

This signal is used in conjunction with BSDBWD. During read response cycles, BSDBPL indicates whether the response is not the last or last data element requested.

BSSHBC (Second-Half Bus Cycle)

This signal may either serve to identify the second bus cycle as a response to a read request or as information to set or reset the lock in conjuction with BSLOCK.

BSLOCK (Lock)

This signal when true indicates that this cycle is conditional upon the state of the lock flip-flop in the slave, usually main memory 10 through 12, to indicate that this cycle will either test and set, or reset the lock flip-flop in conjunction with BSSHBC in order to synchronize system processes.

BSWRIT (Bus Write)

This signal indicates when true that this transfer is from master to slave. When this signal is false accompanying a transfer, the master is requesting information from the slave. The information when it become available will be supplied as a separate transfer.

BSMREF (Memory Reference)

This signal indicates when true that the address leads contain a memory address. When false, this signal indicates that the address leads contain a channel number and a function code.

BSREDL (Red Left)

This signal when true indicates that the accompanying transferred information is in error. This signal is used by memory on Read response to indicate an uncorrectable error in the leftmost word returned (if two words are returned in parallel) or a single word.

BSREDR (Red Right)

This signal when true indicates that the accompanying transferred information is in error. This signal is used by memory on Read response to indicate an uncorrectable error in the rightmost word returned (if two words are returned in parallel).

BSLKNC (Lock; No Memory Cycle)

This signal has significance only during locked memory read requests (BSLOCK true). When true, it instructs the memory to inhibit the actual read operation requested while at the same time allowing the other operations associated with the request to proceed. The response to the request, BSACKR or BSNAKR will be the same whether BSLKNC is true or false, and the setting, clearing and testing of the lock flip-flop in main memory 10 through 12 will be performed. The cycling of the memory module will be inhibited; no second-half bus cycle will occur, and the memory will not go busy.

BSRINT (Resume Interrupting)

This signal is usually issued by the CSS 3 through 5 (and can in some cases be issued by the SMF-20) when it is, again, in a state to receive interrupts. After having been NAKed on one or more prior interrupt requests, the interrupt(S) are "Stacked" in the peripheral controllers 14 through 16. Upon detecting a true transition of BSRINT, those controllers will again attempt to send the interrupt to the CSS 3 through 5 (which may result in another NACK response).

Note that this signal is treated by the receiving controllers 14 through 16 as asynchronous, however, a sender of BSRINT, must be synchronized with a system bus 2 cycle in order to prevent more than one driver source from being active on the system bus 2 at a time in a multiprocessor system.

BSRINT must be valid for a minimum of 100 nanoseconds and can have anomalous system behavior from 'fuzzy' trailing edge transitions of BSRINT.

BSPWON (Bus Power On)

This asynchronous signal is normally true when all power supplies are in regulation and the internal cabinet temperature is within acceptable operating limits. The signal becomes false when a system (i.e., power control failure, overloading, "Red Level" overtemperature, etc.).

The signal BSPWON is normally generated by the SMF 20 through information provided by the power system 22, but may in some cases be driven by certain communication controllers 20-6 and 20-8 to simulate a system recovery from an up-line host. During a Power-On transition, a positive-going edge of BSPWON indicates that system power has come up and became stable and a system initialization is to take place. Subsequent to initialization a steady power onstate indicates a stable set of system operation conditions. Upon sensing a failure, or Power Off condition, BSPWON will transition to off and all peripheral controllers 14 through 16 must cease all traffic on the bus, and perform a self-initialization in order to enable the CSS 3 through 5 to store the system state and recovery information in main memory 10 through 12 (memory must be non-volatile for Restart conditions). A false going transition of BSPWON must precede the actual loss of DC regulation by a minimum of 3.0 milliseconds and the memory controllers must enter a protected state (no bus cycles accepted) at 2.5 to 3.0 milliseconds after a failure is sensed, to preserve the system state information.

BSACKR (ACK)

The slave signals to the master that it is accepting this transfer by making this signal true.

BSNAKR (NAK)

The slave signals to the master that it is refusing this transfer by making this signal true.

BSWAIT (WAIT)

The slave signals to the master that it is temporarily refusing the tranfer by making this signal true.

BSDCNN (Data Cycle Now)

When true this signal indicates that a specific master is making a system bus 2 transfer and has placed information on the system bus 2 for use by some specific slave. When false, the system bus 2 is idle or between bus cycles.

BSMCLR (Bus Master Clear)

This asynchronous signal is normally false and becomes true when a system condition is detected that requires system operation to be completely aborted and a 'Halt', 'Restart' or 'Reboot' operation is to be performed by the SMF 20. Sources of Master Clear are normally derived from the Power-On sequence and the Control Panel Clear Pushbutton (both SMF 20 originated), but can originate from certain Communication controllers that have the ability to perform a down-line load from an attached host.

When BSMCLR is true, all units on the system bus 2 will initialize. In additon, units that are capable of doing so, will run their QLT's. Successful completion of the QLT's is indicated when the SMF 20 receives the BSQLTA signal.

BSRESQ (Response Qualifier)

This signal will be driven in conjunction with BSACKR, to indicate to the requesting bus master that the slave recognizes the invocation of the functionality, and is responding appropriately. Three types of requests can elect this qualified response:

read requests that may result in a two-word, second-half bus cycle (indicated by BSDBWD—true);

write requests that attempt to write data signals BSDT16 through BSDT31 (indicated by BSDBWD—true); and read requests that attempt to lock or unlock a memory without cycling it (indicated by BSLKNC—true).

System bus request and response control logic 20-18 includes master control logic to gain control of system bus 2 for the SMF 20 and to send the SMF 20 command or response to a command over system bus 2 to the slave unit.

Since the SMF 20 occupies the highest priority position on system bus 2, if SMF 20 requests access to system bus 2, it is granted the next cycle as soon as the present bus cycle is completed. Logic 20-18 will generate signal MYDCNN which is applied to drivers 20-66, 20-62 and 20-72 to put data, address and control information on system bus 2. Logic 20-18 also sends bus signal BSDCNN over system bus 2 to indicate to all subsystems that the system bus 2 is "in use".

Logic 20-18 now awaits any one of a number of responses from system bus 2. The possible responses are:

1. No response is received for 3us.

2. Wait response is received (BSWAIT).
3. A not acknowledge response is received (BSNAKR).
4. A Lock No Cycle (LKNC) is acknowledged (BSLKNC) (BSACKR).
5. A write (one word write or BSRESQ Received) is acknowledged (BSACKR).
6. A write (BSRESQ not received and Double Word) is acknowledged (BSACKR).
7. A READ cycle is acknowledged (BSACKR).

Logic 20-18 will terminate this system bus 2 cycle and again request access to system bus 2 if a BSWAIT or BSNAKR response was received, or if a BSACKR response was received for a write double word request.

Logic 20-18 includes slave control logic which is activated when a second half bus cycle is expected in response to a read command sent by SMF 20 to main memory 10 through 12, CSS 3 through 5, or peripheral controllers 14 through 16. Slave control logic is also activated when a bus cycle includes the SMF 20 channel number hexadecimal 0F. The second half bus cycle is accepted by SMF 20 if no error conditions are present and an acknowledge response BSACKR is sent out on the system bus 2 by SMF 20 to the master.

If the second half bus cycle is accepted, then signals from the mode register control the incrementing or decrementing of the output address counter 20-34 depending on the number of data words being transferred as indicated by bus control signal BSDBWD.

SMF 20 will accept an unsolicited command if the channel number is hexadecimal 0F, there are no parity errors, this is not a second half bus cycle (BSSHBC false), bus address signals contain a function code and channel number (BSMREF false) and the function code is legal for the SMF 20. The SMF 20 will respond over system bus 2 with an acknowledge signal BSACKR, a not acknowledge BSNAKR signal or will ignore the command if bad parity or an illegal function code exists.

The SMF 20 may send a command to read a main memory 10 through 12 location and send the contents of that location to another subsystem, typically the CSS 3 or CSS 5. In this case the second half bus cycle will not be addressed to SMF 20. Main memory 10 through 12 will send the acknowledge signal BSACKR out on the system bus 2 and send the second half bus cycle command out on system bus 2 having the channel number of the destination subsystem. Since the SMF 20 will not receive the second half bus cycle, it must terminate the command.

The Acknowledge signal BSACKR is received by the system bus end of cycle control logic 20-19. The microprocessor 20-2 generates address signals which are decoded by address decoders 20-4 to generate signal CKMDO2. Also microprocessor 20-2 generates data signal D00 over data bus 20-52. Signals BSACKR, CKMD02, and D00 reset the SMF 20 cycle on signal SMFCLY which is applied to system timer 20-32 to reset the timeouts thereby terminating the command. During normal operation the timeouts are verifying that the expected second half bus cycle command is received by SMF 20 within a predetermined time. If the command is not received within the predetermined time, a timeout signal will cause the SMF 20 to repeat the read memory command.

The ADI 33 interface couples the B channel of the communication controller 20-6 to the auxiliary device 32. This is a standard EIA RS-232C Type Z interface with a data rate of up to 1200 baud The interface signals are typically transmit data, receive data, data set ready and request to send.

The CAI 31 interface couples the A channel of the comunication controller 20-8 to the console adapter 30. This interface may be the RS232C asynchronous interface on the RS 422 asynchronous interface. The RS 232C interface signals are transmit data, receive data, clear to send and data set ready. The RS 422 interface signals are transmit data, receive data and data stream control.

The RMO 37 interface couples the A channel of communication controller 20-6 to the remote console 42.

The RMO 37 interfaces with a typical modem 36 as described in the discussion of FIG. 1.

The DTI 29 interface couples the B channel of communication controller 20-8 and matches the CAI 31 interface.

Communication controllers 20-6 and 20-8 are Zilog Z80 SIO/O serial input/output controller described in the aforementioned Zilog Gold Book.

Communication controllers 20-6 and 20-8 interrupt microprocessor 20-2 over a common interrupt line. Microprocessor 20-2 responds to the interrupt by sending out the $\overline{\text{MI}}$ and IORQ signals as well as signals A14 and A15. The interrupting controller 20-6 or 20-8 responds by sending the status over the data bus 20-58. Microprocessor 20-2 then branches to a software routine based upon the status to process the activity. Typical functions performed by the software by responding to the communications controller 20-6 and 20-8 status signals are, transmit buffer empty, extend status change, receiving character available and special receive condition.

Load Mode

Figure 3:
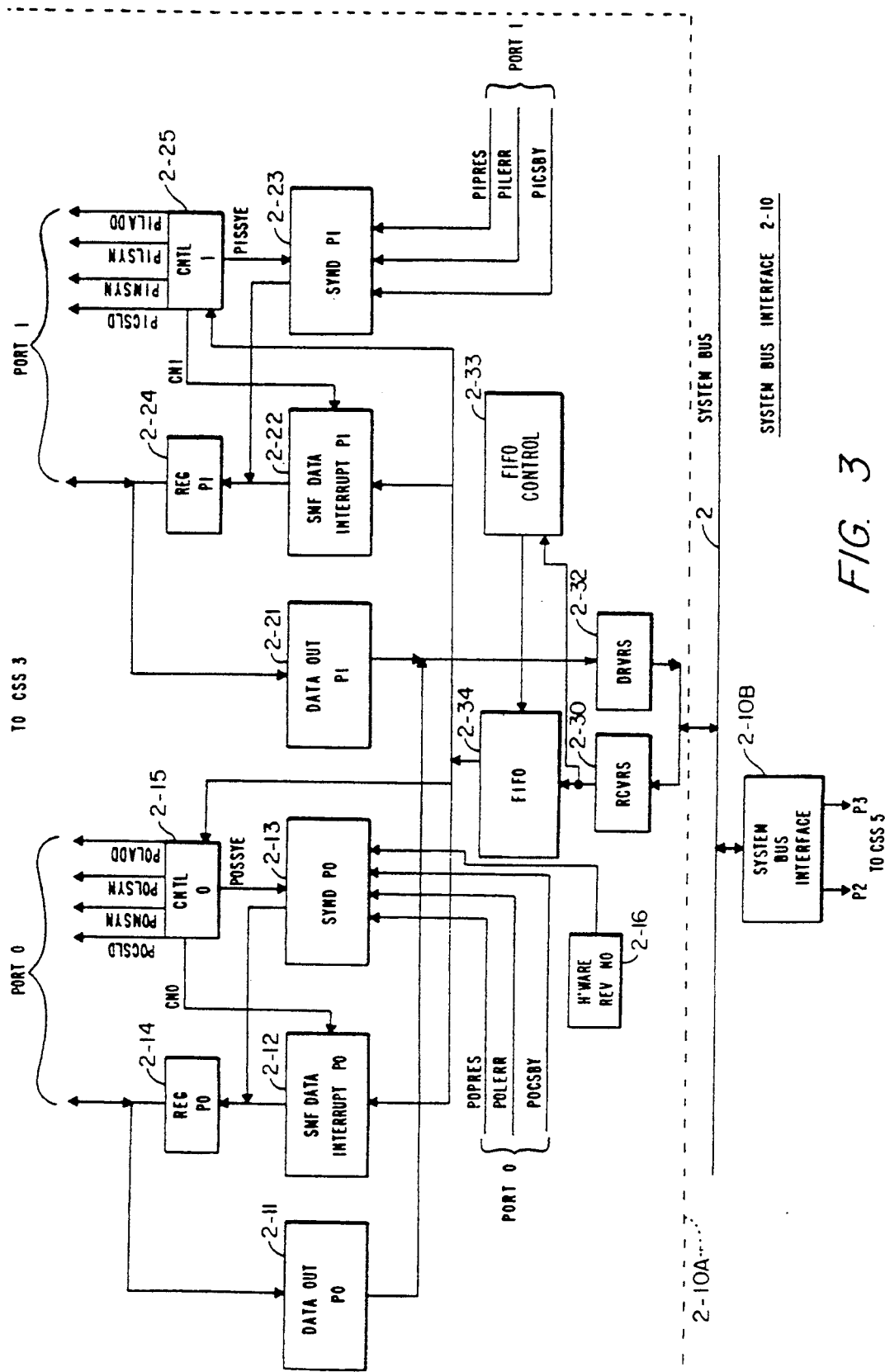
FIG. 3 shows a block diagram of a system bus interface.

FIG. 3 shows a block diagram of the system bus interface 2-10A. Commands from system bus 2 are applied to a first-in first-out (FIFO) register 2-34 through receivers 2-30. The format of the various commands are shown in FIGS. 5A-5E. The commands include a channel number specifying the command destination unit and a function code specifying the operation the receiving unit will perform.

A FIFO control 2-33 receives specified command signals from system bus 2 via receivers 2-30. The specified command signals enable FIFO control 2-33 to have the specific commands loaded into FIFO 2-34.

Figure 5A:
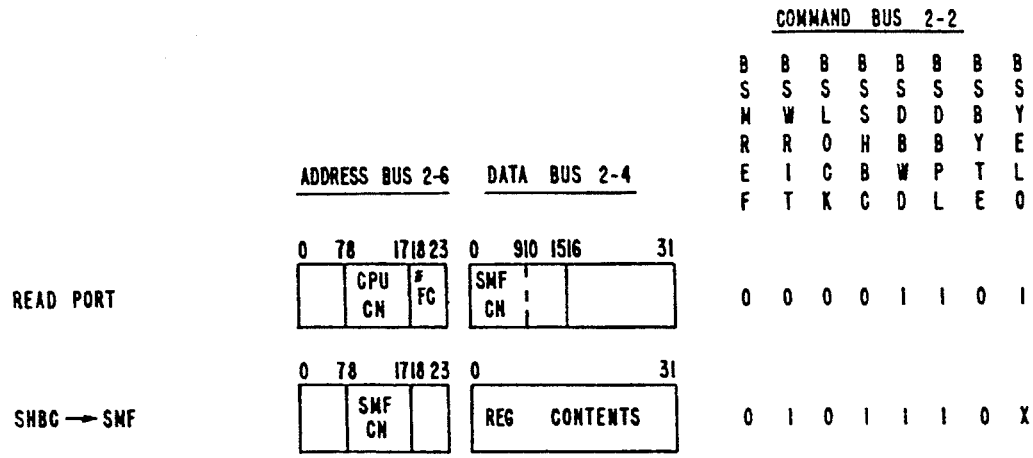
FIGS. 5A through 5E show the formats of various commands that are applied to a system bus.
Figure 5B:
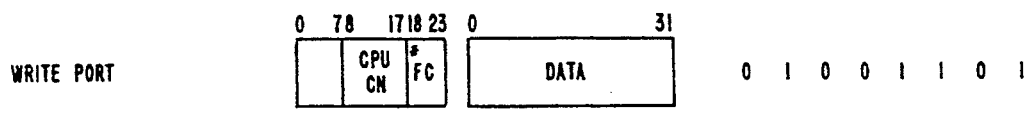
Figure 5C:
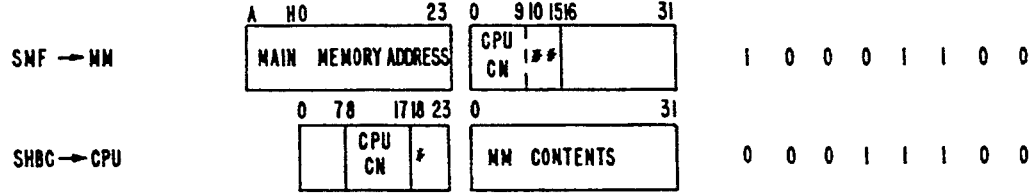

If the SMF to main memory command of FIG. 5C has the channel number of hexadecimal 00, then the FIFO control 2-33 is responsive to data signals 0-9 to generate a signal to load the command into the FIFO. FIFO control 2-33 is also conditioned to receive a second half bus cycle.

Figure 4:
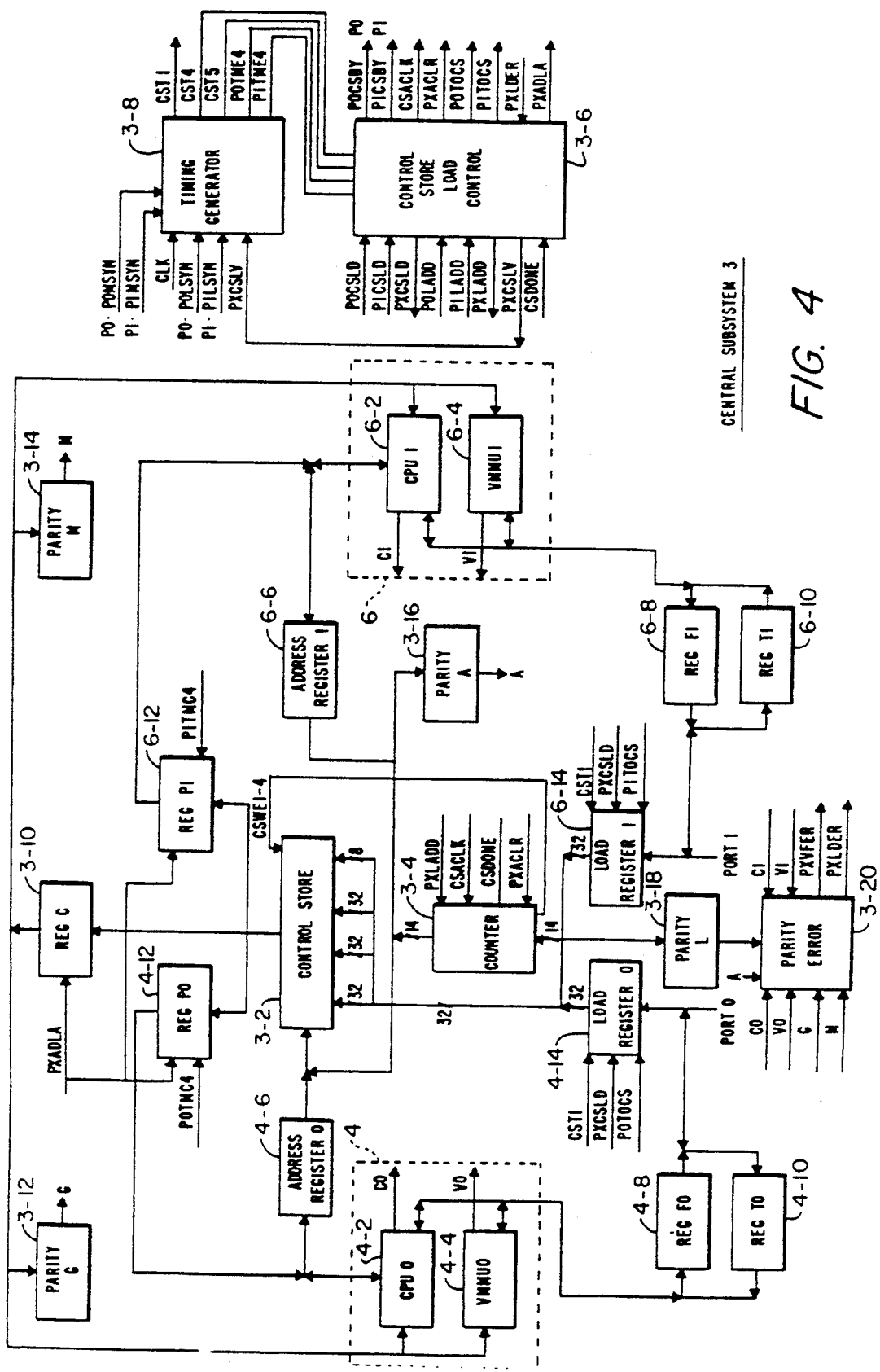
FIG. 4 shows a block diagram of a central subsystem.

FIFO control 2-33 is responsive to the SHBC to CPU command channel number hexadecimal 00 specified by address signals 8-17 to load the contents of main memory into the FIFO 2-34 for subsequent storage in control store 3-2 of FIG. 4.

The master clear signal BSMCLR is applied to control logic CNTL 0 2-15 and CNTL 1 2-25 to generate master sync signals P0MSYN and P1MSYN respectively to control the normal operation of CSS 3. The load mode is generated by the SMF 20 which sends a load command which includes a channel number and a function code. Control logic CNTL 0 2-15 is enabled by the channel number hexadecimal 00. Control logic CNTL 1 2-25 is enabled by the channel number bits hexadecimal 01. Similar control logic in system bus interface 2-10B is responsive to channel numbers hexadecimal 02 and 03 respectively.

CNTL 0 2-15 is responsive to the load command function code hexadecimal 0D to generate signal P0CSLD if the channel number hexadecimal 00 is specified. CNTL 1 2-25 is responsive to function code hexadecimal 0D to generate signal P1CSLD if the channel number hexadecimal 01 is specified.

Similarly CNTL 0 2-15 and CNTL 1 2-25 are responsive to their respective channel numbers and a function code of hexadecimal 11 specifying a load control store address counter operation to generate signals P0LADD and P0LSYN or P1LADD and P1LSYN.

During the load control store data transfer operation, data from main memory 10 through 12 is stored in the SMF internal data (P0) register 2-12 if the load commands specify channel number hexadecimal 00. Similarly the load control store operation data from main memory 10 through 12 is stored in the SMF data interrupt register 2-22 if the load commands specify channel number hexadecimal 01. Register 2-12 and register 2-22 are loaded from the system bus 2 via receivers 2-30 and FIFO 2-34.

A syndrome register 2-13 stores information received from port 0, and a syndrome register 2-23 stores information received from port 1. Signal P0PRES stored in syndrome register 2-13 indicates that CPU0 4 is present in the system, signal P0LERR indicates that there was a control store load error and signal P0CSBY indicates that the load operation was not completed. Signal P1PRES, P1LERR and P1CSBY stored in syndrome register 2-23 indicate these conditions for CPU16.

A read syndrome register command having a function code of hexadecimal 00 will result in CNTL 0 2-15 generating signal P0SSYE for a channel number of hexadecimal 00 and CNTL 1 2-25 generating signal P1SSYE for a channel number of hexadecimal 01. The contents of syndrome register 2-13 when enabled by signal P0SSYE will appear on the system bus 2 via a register 2-14, a data out register 2-11 and drivers 2-32.

Similarly the contents of syndrome register 2-23 will appear on system bus 2 via a register 2-24 a data out register 2-21 and drivers 2-32.

Syndrome register 2-13 stores a hardware revision number which indicates the personality CSS 3 will have. It is loaded from logic 2-16. The hardware revision number is used during the load operation to select the firmware loaded into control store 3-2 of FIG. 4. Note that only syndrome register 2-13 of port 0 stores the hardware revision number. If the hardware revision number is not read from port 0, then port 1 is not used and the firmware load for CSS 3 is aborted.

The SMF data interrupt registers 2-12 and 2-22 provide an output when control logic CNTL 0 2-15 receives a command having the channel number hexadecimal 00 and the function code of hexadecimal 06 to generate signal CN0. CNTL 1 2-25 receives channel number hexadecimal 01 and the function code hexadecimal 06 to generate signal CN1. Signal CN0 enables register 2-12 and signal CN1 enables register 2-22. During load mode, the default case is signal CN0 or CN1 enabled unless the SMF 20 sends a function code of hexadecimal 00. During the control store load mode, data is loaded into the 32 bit registers 2-12 or 2-22 on 4 bus cycles to transfer 104 data bits to the control store 3-2 FIG. 4. Each cycle generates a P0LSYN or P1LSYN signal.

The SMF 20 sends a read command to the active port 0 or port 1 with a function code of hexadecimal 00 to read the contents of syndrome registers 2-13 or 2-23 respectively.

Signals P0SSYE or P1SSYE enables the output of the selected syndrome register 2-13 or 2-23 to place the contents on the system bus 2 via register 2-14 or 2-24, data out register 2-11 or 2-21 and drivers 2-32.

FIG. 4 is a block diagram of CSS 3 which is coupled to the system bus interface 2-10A by port 0 and port 1. Port 0 operates with CPU0 4-2 and VMMU0 4-4 of CPU1A 4 FIG. 1. Port 1 operates with CPU1 6-2 and VMMU1 6-4 of CPU1B 6CSS 5 operates in a similar manner through ports 2 and 3.

The control store 3-2 stores the firmware to control the operation of CPU0 4-2 and VMMU0 4-4 and their associated registers and logic; and also the operation of CPU1 6-2 and VMMU1 6-4 and their associated registers and logic. The control store 3-2 stores 16K words of 104 bits per word.

An address counter 3-4 provides address signals which select locations of control store 3-2 into which the control store data is written. A load register 0 4-14 is coupled to register P0 2-14, FIG. 3, of port 0 to receive a starting control store address and control store data words which are written into control store 3-2 at locations specified by counter 3-4, when the load command includes the channel number hexadecimal 00. In a similar manner a load register 1 6-14 is coupled to register P1 2-24, FIG. 3, of port 1 to receive the starting control store address and control store data words which are written into control store 3-2 at locations specified by counter 3-4 by the load command including decimal number hexadecimal 01.

A timing generator 3-8 provides timing signals and a control store load control 3-6 provides control signals which in conjunction with the timing signals control the load operation. Timing generator 3-8 is also responsive to signal P0MSYN and P1MSYN to generate timing signals to control normal operations.

Parity L 3-18 generates a load error signal PXLDER during the load operation if the control store words outputted from register 0 4-14 or register 1 6-14 indicate a parity error.

Parity error logic 3-20 generates a parity error signal PXVFER during a control store verify load operation when signals received from one or more parity check circuits 3-12, 3-14, 3-16, CPU 0 4-2, VMMU 0 4-4, CPU 1 6-2 and VMMU 1 16-4 indicate a parity error by generating signals G, M, A, C0, V0; or signals G, M, A, C1 and V1 respectively during the verify load operation.

During normal operation the control store 3-2 is addressed by the contents of an address register 0 4-6 or by the contents of address register 1 6-6. Registers 4-6 and 6-6 are loaded from CPU0 4-2 or CPU1 6-2 respectively. During the load and verify operation the control store 3-2 is addressed by the contents of counter 3-4. In both the normal and the verify operation the addressed location of control store 3-2 is loaded into a register C 3-10 and L either register P0 4-12 or register P1 6-12.

CPU0 4-2, VMMU0 4-4, CPU 1 6-2 and VMMU 1 6-4 receive the control store signals from register C 3-10. CPU0 4-2 receives the control store signals from register 4-12 and CPU 1 6-2 receives the control store signals from register 6-12.

The CPU0 4-2 generates signal C0 and VMMU0 4-4 generates signal V0. Signals C0 and V0 are applied to parity error logic 3-20. Signals C0 and V0 are the resultant parity of the control store bits received by the respective units.

Similarly CPU1 6-2 generates signal C1 and VMMU1 6-4 generates signal V1. Signals C1 and V1 are applied to parity error logic 3-20, signals C1 and V1 are the resultant parity of the control store bits received by the respective units.

Registers 3-10, 4-12 and 6-12 are loaded by clock signal PXADLA. The outputs of registers 4-12 and 6-12 are available at P0TMC4 time and P1TMC4 time respectively. The output of register 3-10 is available when loaded. Signal PXADLA is available at PXTME2 and PXTME4 time. The registers 4-12 and 6-12 are loaded at the leading edge of "2 time" for CPU1 6-2 and VMMU1 6-4 and loaded at the leading edge of "4 time" for CPU0 4-2 and VMMU0 4-4 and available at the trailing edge of "2 time" for CPU1 6-2 and VMMU16-4, and available at the trailing edge of "4 time" for CPU0 4-2 and VMMU0 4-4.

During normal operation a data output register F0 4-8 and a data input register T0 4-10 couple CPU0 4-2 and VMMU0 4-4 to the system bus interface 2-10A via port 0. Similarly a data output register F1 6-8 and a data input register T 16-10 couple CPU1 6-2 and VMMU1 6-4 to system bus interface 2-10A via port 1.

If the load command includes the channel number hexadecimal 00 then signal P0LSYN is generated by CNTL 0 2-15, FIG. 3, and applied to the timing generator 3-8 which becomes responsive to a free running clock signal CLK and generates a sequence of signals which include clock signal CST1 through clock signal CST5.

Signals P0CSLD or P1CSLD are applied to logic 3-6 to generate signal PXCSLD. Signal PXCSLD enables both registers 4-14 and 6-14. Also signal P0CSLD generates signal P0TOCS to enable the output of register 4-14. Signal P1CSLD generates signal P1TOCS to enable the output of register 6-14. Clock signal CST1 clocks the starting address or control store data words into registers 4-14 and 6-14. PXCSLD also generates clock signal CSACLK at CST5 time.

Signals P0LADD and P1LADD are applied to load control 3-6 to generate load address signal PXLADD at CST1 time if either signal and signal PXCSLD are set. Counter 3-4 is loaded by signal PXLADD and incremented by clock signal CSACLK. Write enable signals CSW1 through CSW4 are generated sequentially each CST4 time on successive double word transfers from main memory 10 through 12. The signals are conditioned by an internal counter which advances at CST5 time by the clock signal CSACLK.

The load operation is implemented in the following manner. Initially the SMF 20 generated a system clear signal BSMCLR which generates master sync signals P0MSYN and P1MSYN during the system clear operation and inhibits these signals when the system clear operation is completed. This prevents CPU0 4-2 and VMMU0 4-4 and CPU1 6-2 and VMMU1 6-4 operation. Then assuming port 0 is available then the SMF 20 generates a control store load command having a channel number of hexadecimal 00 and a function code of hexadecimal 0D. The system bus interface 2-10A is responsive to the hexadecimal channel number and function code signals to generate the load control store signal P0CSLD which conditions the port 0 logic. Load signal PXCSLD and load and verify signal PXCSLV are in turn generated by load control 3-6.

The SMF 20 then sends a command having a channel number of hexadecimal 00, a function code of hexadecimal 11 and a starting control store address typically hexadecimal 0000. The function code signals are applied to CNTL 0 2-15 to generate signals P0LADD and P0LSYN. The address is stored in counter 3-4 via register 4-14, register 2-14, register 2-12, FIFO 2-34, receivers 2-30 and system bus 2.

The SMF 20 then sends a series of read commands to main memory 10 through 12 with the port 0 channel number hexadecimal 00 as the initiating subsystem. The read command includes the main memory 10 through 12 address location in which is stored a double word of the control store 3-2 data.

Main memory 10 through 12 sends a second half bus cycle command which has a channel number of hexadecimal 00 in the address field and 32 bits in the data field. The data is received by register 4-14 via register 2-14, register 2-12, FIFO 2-34, receivers 2-30 and system bus 2. Counter 3-4 applies the address of the location in control store 3-2 that will store the double word. The counter 3-4 increments once for every double word received by register 4-14. Counter 3-4 generates write enable signal CSWE1 for the first double word, write enable signal CSWE2 for the second double word, write enable signal CSWE3 for the third double word and write enable signal CSWE4 for the fourth double word.

The first double word is stored in bit positions 00-31 of control store 3-2, the second double word is stored in bit positions 32-63, the third double word is stored in bit positions 64 through 95 and the portions of the fourth double word are stored in bit positions 96 through 103. Each 104 bit word includes a parity bit which is stored in control store 3-2. The SMF 20 sends a sufficient number of main memory 10 through 12 read commands to load the control store 3-2 with the required control store words.

Verify Mode

The master clear signal BSMCLR had previously prevented signals P0MSYN and P1MSYN from cycling thereby disabling the CPU0 4-2, VMMU0 4-4 and CPU1 6-2, VMMU1 6-4 operation. However signals P0LSYN and P1LSYN applied to control logic 3-6 activate the load mode timing signals CST1 and CST4 and CST5.

After the required number of double words are sent from main memory 10 through 12 under control of the SMF 20 read memory command, the SMF 20 generates the reset load command which specifies the function code of hexadecimal 0F. This resets signal PXCSLD since signal P0CSLD is reset control 0 2-15. However the load and verify signal PXCSLV remains set. Signal PXCSLV was set at the start of the load operation by load control 3-6 when either signals P0CSLD or P1CSLD from control 0 2-15 or control 1 2-25 was set.

When load signal PXCSLD is reset and verify signal PXCSLV remains set. The SMF 20 generates the port on line command function code hexadecimal 0B to generate signal P0MSYC or P1MSYN in CNTL 0 2-15 or CNTL 1 2-25 respectively. These signals applied to timing generator 3-8 start the CPU timing chain which includes timing signals P0TM4 and P1TM4 then address counter 3-14 is reset to hexadecimal 0000 by counter clear signal PXACLR from load control 3-6 on the first occurrence of signals P0MSYN or P1MSYN. This generates signal P0CSVF or signal P1CSVF to end the address counter 3-4 reset operation when signal PXACLR is reset and clock signal CSACLK begins to cycle. During the verify operation clock signal CSACLK is activated at each clock signal to increment counter 3-4 at P0TM4 time by verify signal PXCSLV after load signal PXCSLD is reset.

The verify mode continues until the address counter 3-4 generates a CSDONE signal indicating that the address counter 3-4 has read the contents of each location of control store 3-2 and has verified the parity of each word. Error signal PXVFER is generated if a parity error is sensed. This causes the busy signals P0CSBY and P1CSBY to continue to indicate that the port is busy and remain stored in the respective syndrome register 2-13 or 2-23.

The SMF waits 10 milliseconds for the verify operation to be completed and then sends the command to read the syndrome register 2-13 or 2-23. The command includes the function code hexadecimal 00. If there were no parity errors, the busy bit in the addressed syndrome register will be reset and normal operation will continue.

The verify operation is completed when the CSDONE signal generates the control store reset signal P0CSRT or P1CSRT at clock signal P0TM4 time depending on whether port 0 or port 1 was selected. Reset signal P0CSRT or P1CSRT resets the verify signal PXCSLV and signals P0CSVF or P1CSVF and P0CSBY and P1CSBY.

If the SMF 20 finds that the busy bit is still set when the syndrome register is read then the appropriate firmware sequence of FIG. 6 is followed, that is there may be a retry of the port; or the other port to the CSS may be tried.

Command Formats

FIGS. 5A through 5E show the formats of the various commands used in the preferred embodiment.

Figure 7:
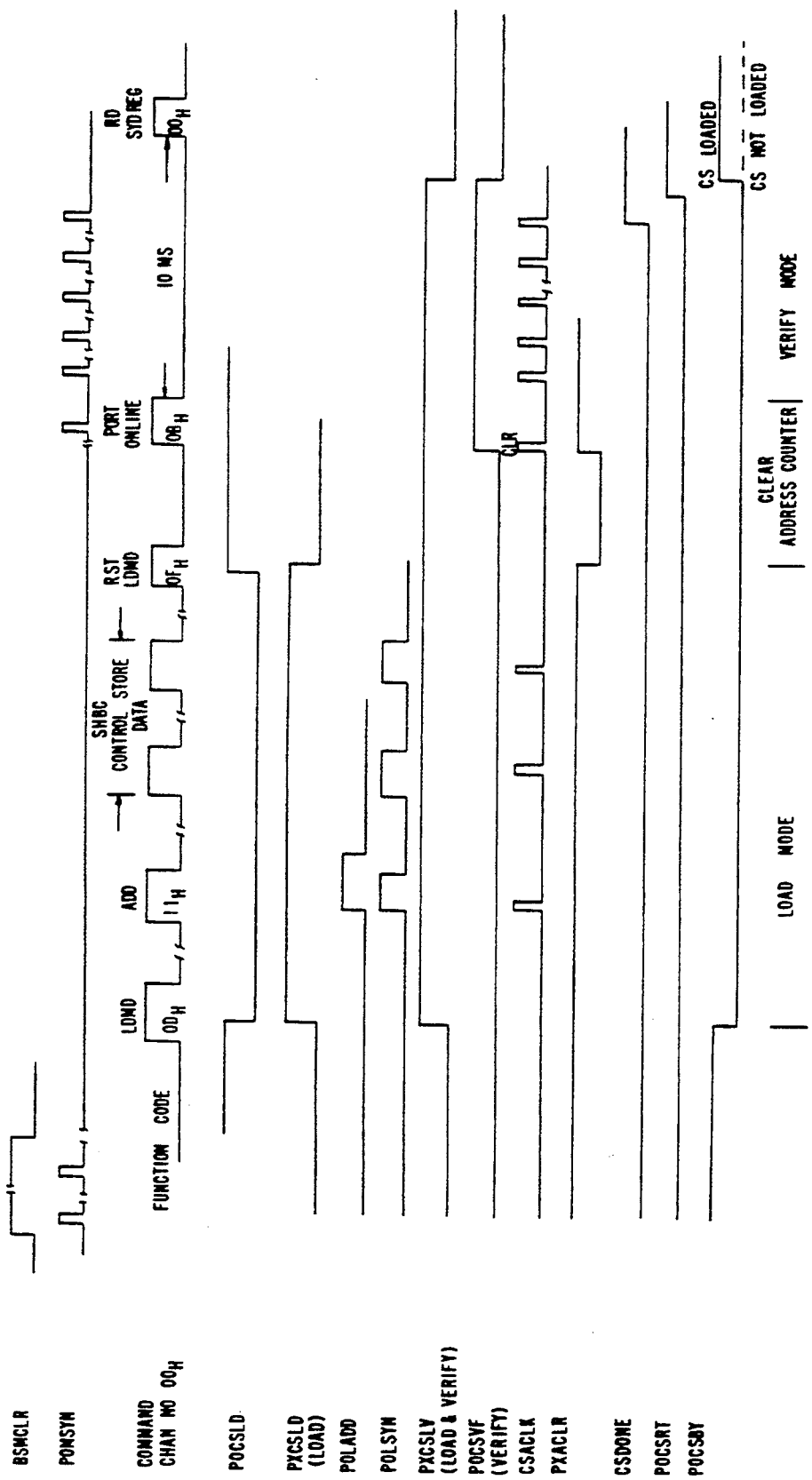
FIG. 7 is a timing diagram of the central subsystem signals that control the loading and verifying of the control store load.

FIG. 5A shows a read port command. The destination CPU channel number is specified in address bus 2-6 bit positions 8-17. The function code is specified in address bus 2-6 bit positions 18-23. The channel number of the SMF 20, the requesting subsystem, is specified by data bus 2-4 bit positions 0-9. Control bus 2-2 signals BSYELO and BSMREF at "1" and "0" respectively indicate that this is an SMF 20 generated command. Signal BSDBWD indicates that thirty-two bits of data, a double word, appear on the data bus 2-4. Signal BSDBPL indicates that the double word is the last data word of this command. The use of this command as a read syndrome register command is shown in FIG. 7. The CPU channel number is hexadecimal 00 which addresses port 0. The function code is hexadecimal 00 which initiates a read syndrome register operation. The SMF channel number hexadecimal 0F (positioned as hexadecimal 03C0) is the destination of the contents of the syndrome register which is sent as a second half bus cycle (SHBC) command to the SMF 20. The SMF channel number, hexadecimal 0f, is included in address bus 2-6 bit positions 8-17 and the contents of the syndrome register of port 0 appear in data bus 2-4 bit positions 0-31. Command bus 2-2 signals BSWRIT specifies a bus write operation and BSSHBC specifies that this is the response to a request (a second half bus cycle).

FIG. 5B shows a write port command. A number of commands shown in the timing chart of FIG. 7 are in the format of FIG. 5B. The load mode command, function code hexadecimal 0D, includes a data field of hexadecimal 0000 0000. The load address counter command function code hexadecimal 11 includes a data field which stores the address of the starting location of control store 3-2 into which the first 104 bit control store word is written. Address counter 3-4 is usually loaded with hexadecimal 0000. However if main memory 10 through 12 has battery backup, the starting address may vary. This enables the system to restore in control store 3-2, just one page of main memory 10 through 12. The reset load mode command function code hexadecimal 0F includes a data field of hexadecimal 0000 0000. The port on line command, function code 0B includes a data field of hexadecimal 0000 0000.

Signals BSMREF and BSYELO at "0" and "1" respectively indicate an SMF 20 generated command. Signal BSWRIT at "1" indicates a bus write command.

FIG. 5C shows the format of an SMF to main memory command and the second half bus cycle response to that command. The 32 bit address bus 2-6 field 0-23, A-H stores the main memory 10 through 12 address location. Data bus 2-4 bits 0 through 9 store the channel number of the destination subsystem, in the preferred embodiment a CPU channel number. Command bus 2-2 signal BSMREF indicates a memory reference command. The second half bus cycle command is initiated in main memory 10 through 12. The data bus 2-4 bits 0-31 contain the contents of the addressed location. Address bus 2-6 bits 8-17 contain the channel number of the destination CPU. Command bus 2-2 signals BSMREF and BSSHBC at logical ZERO and ONE respectively indicate that this command is generated by main memory 10 through 14 in response to the memory request command.

Figure 5D:

FIG. 5D shows the format of an I/O output command which includes the channel number of the I/O device, in this case a disk drive or a floppy disk and a function code. The data bus 2-4 bits include the location of the data on the disk. This command has two formats, a configuration A format with a function code of hexadecimal 11 and a configuration B format with a function code of hexadecimal 13.

The data bus 2-4 bits of configuration A include a cylinder number if the device is a hard disk or a cylinder and track numbers if the device is a floppy disk.

The data bus 2-4 bits of configuration B include the sector and track numbers for the hard disk or the sector numbers and byte density for the floppy disk.

The I/O output command having a function code of hexadecimal 07 indicates by the data bus 2-4 bits whether this is a seek or an auto seek operation. Auto seek calls for a seek, then read.

The command bus 2-2 signal BSWRIT indicates a bus write operation.

Figure 5E:
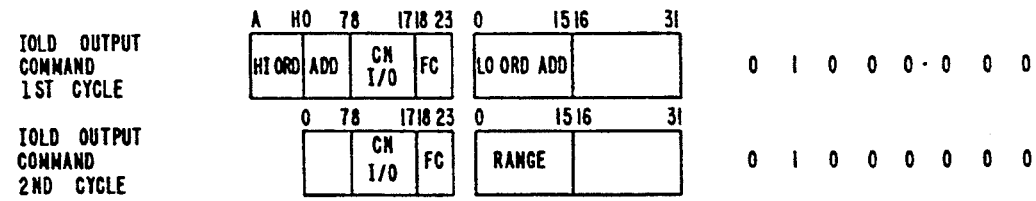
Figure 6A:
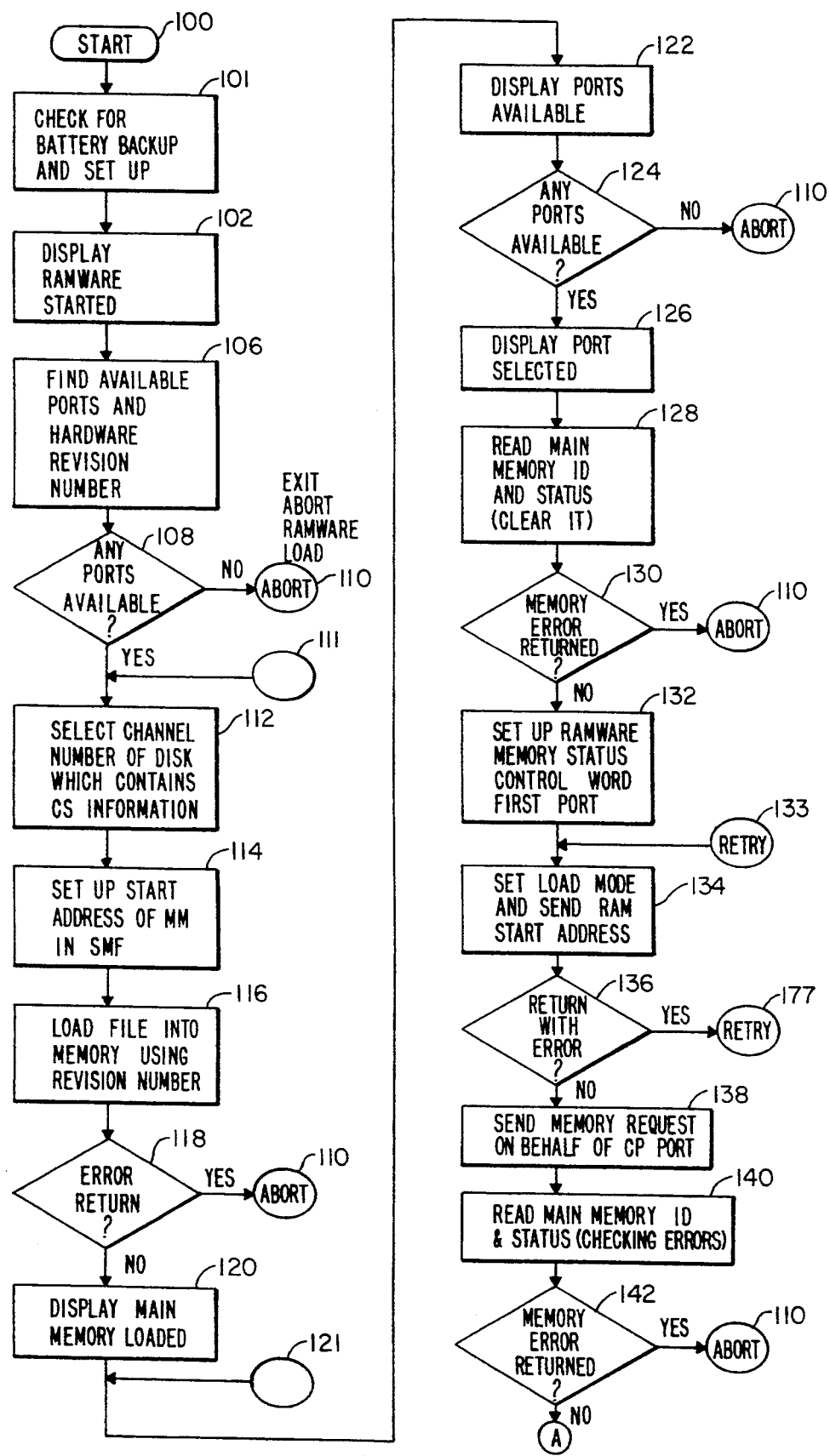
FIGS. 6A, 6B, 6C, 6D, 6E, and 6F (hereinafter FIG. 6) show a flow diagram of the firmware that loads the control store.
Figure 6B:
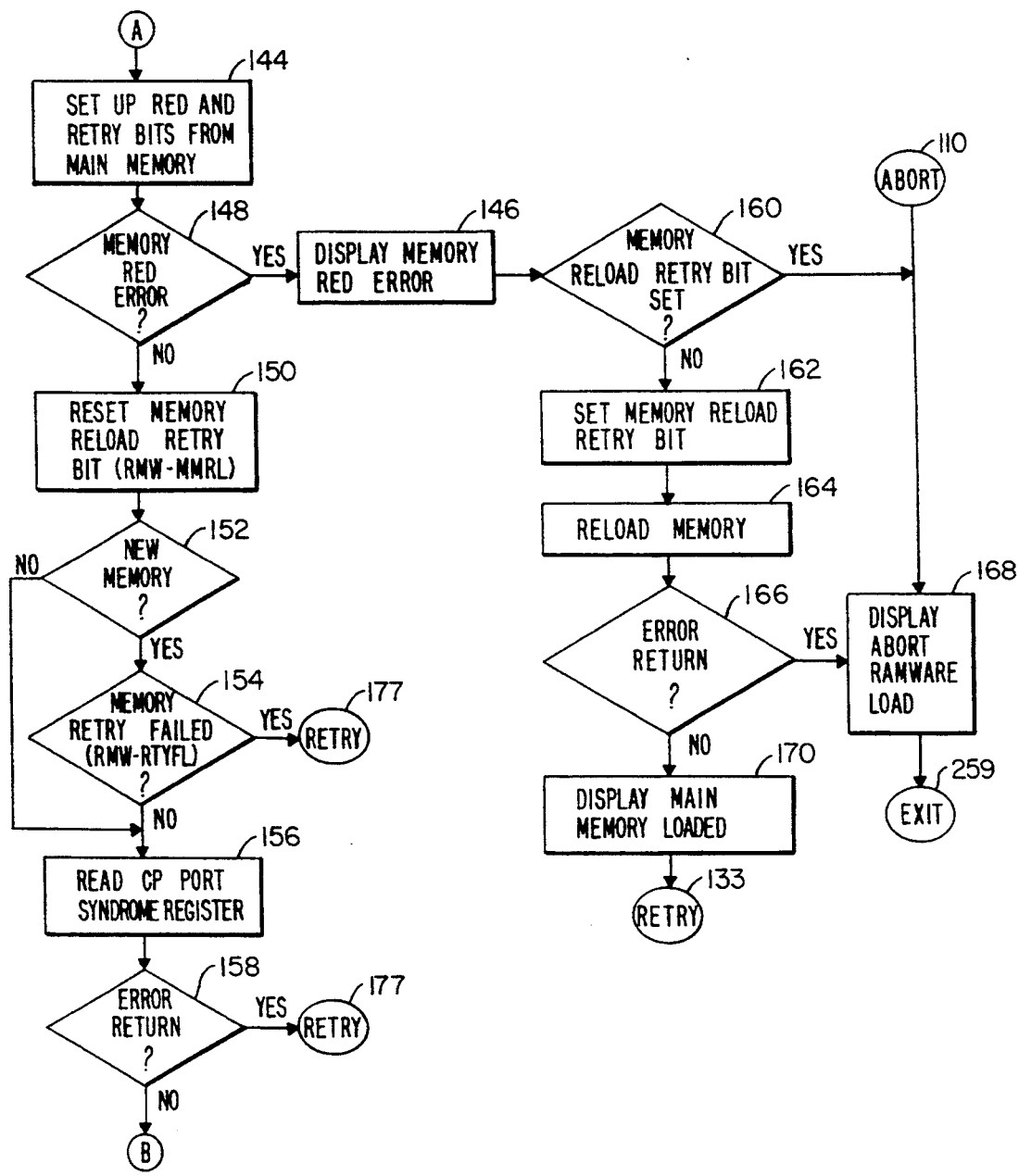
Figure 6C:
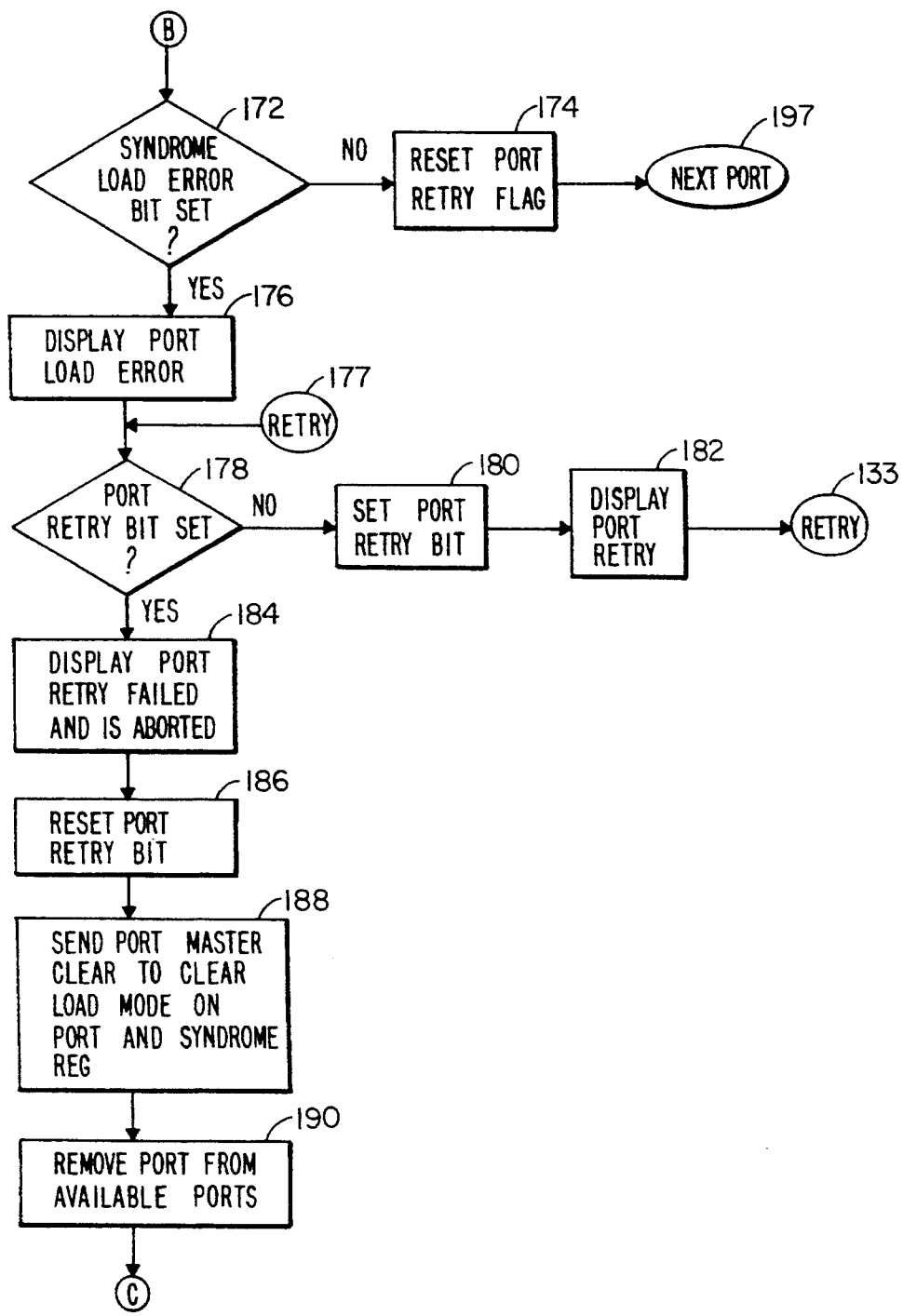
Figure 6D:
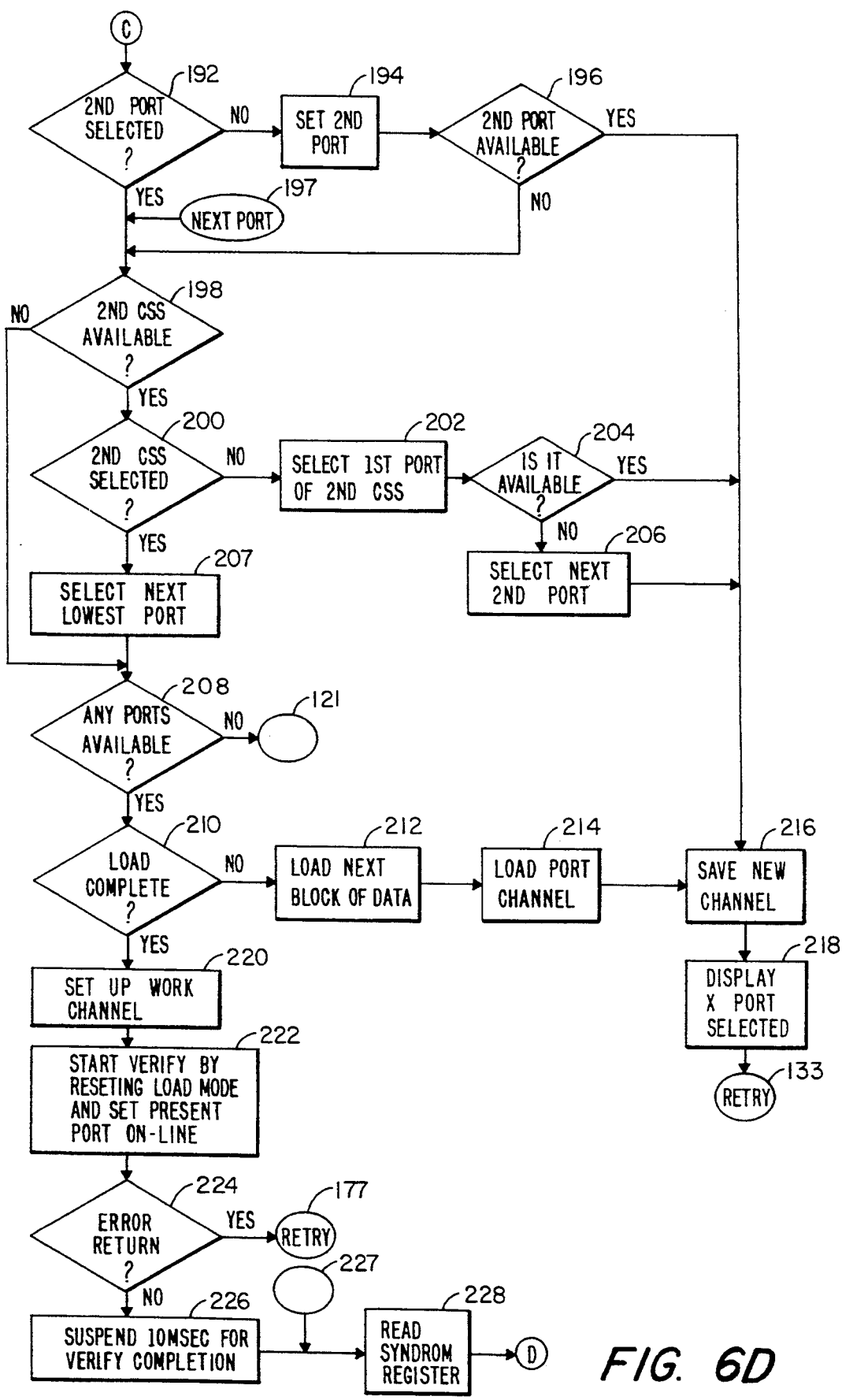
Figure 6E:
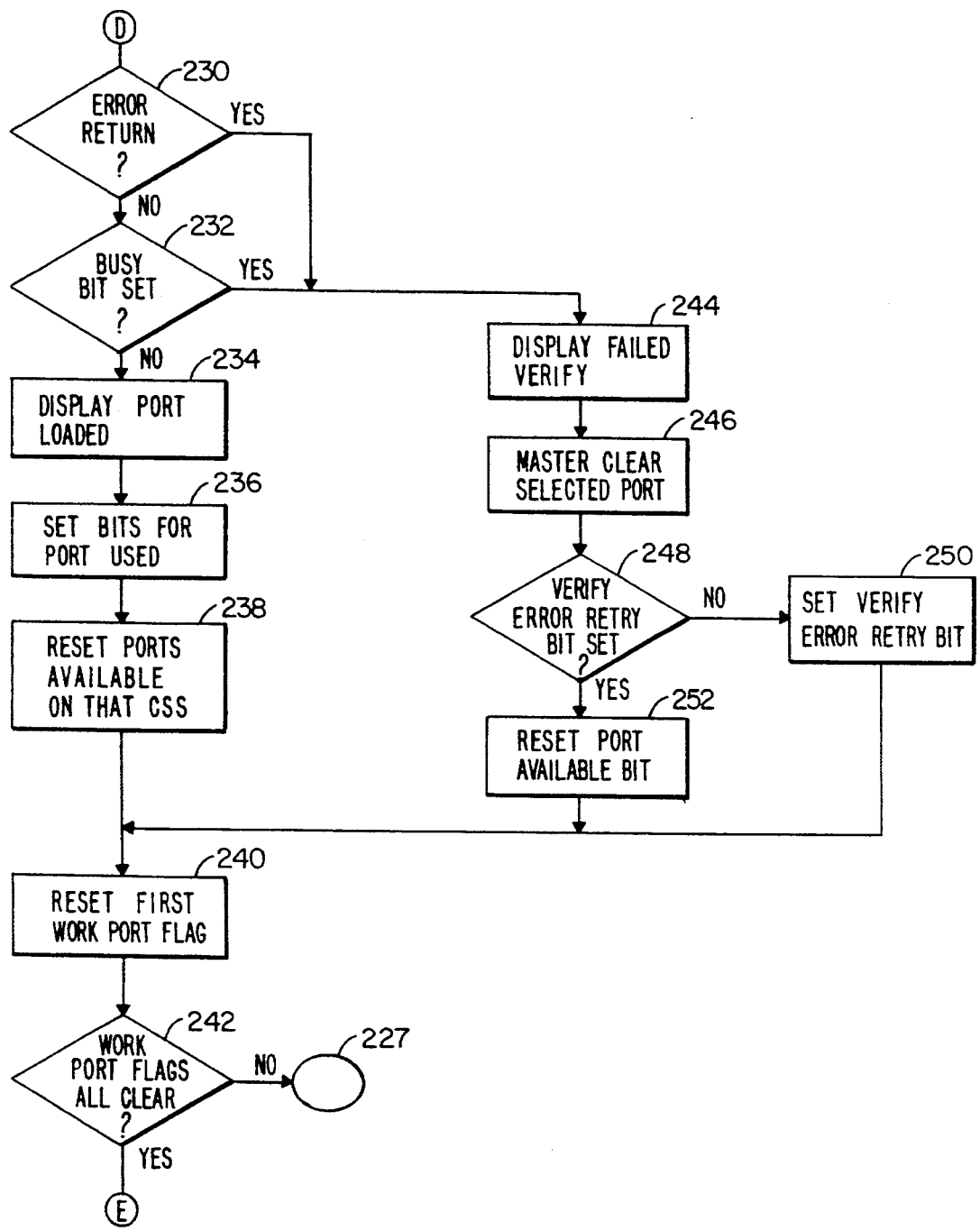
Figure 6F:
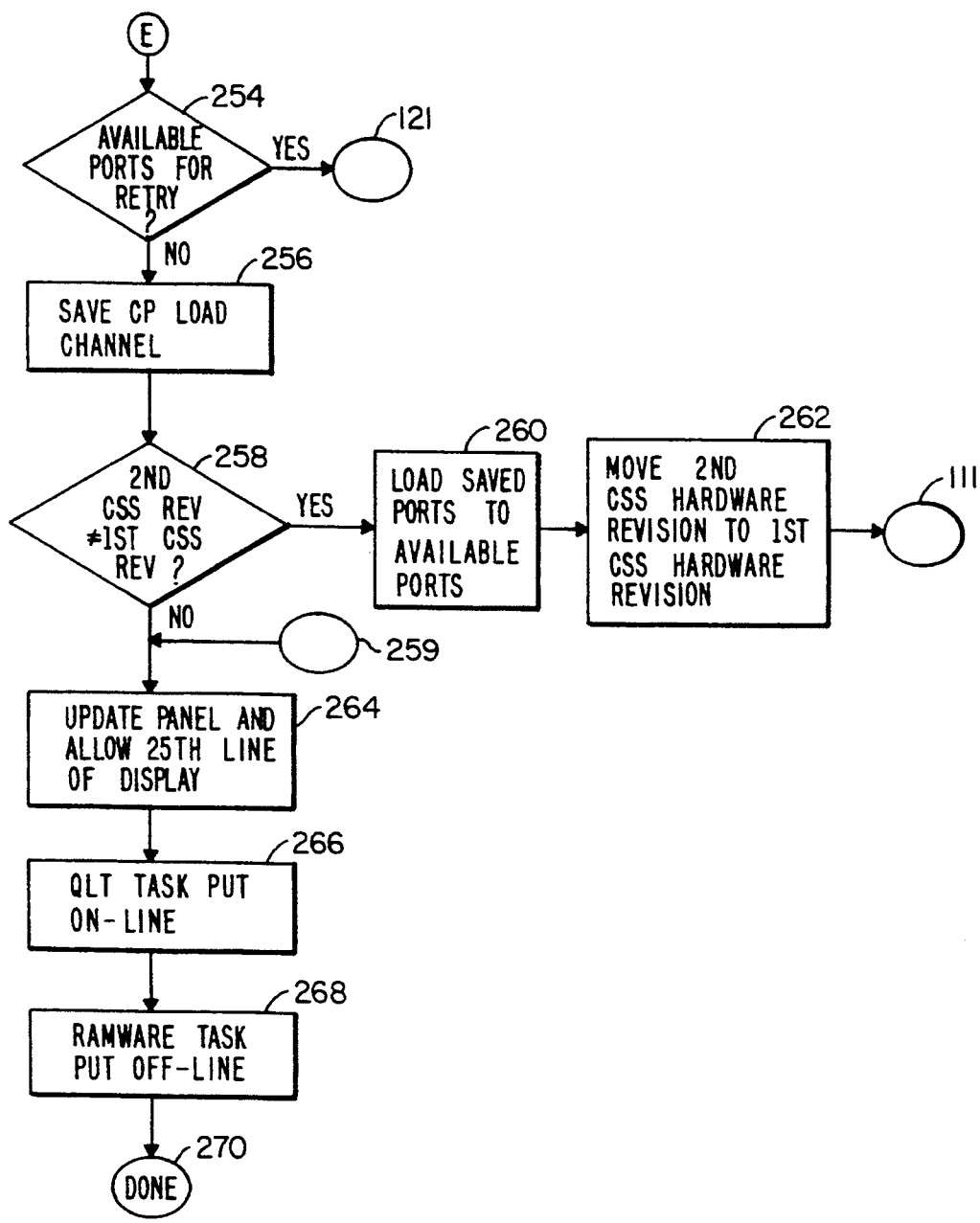

FIG. 5E shows a two cycle input/output load (IOLD) output command. For the first cycle address bus 2-6 bits A-H, 0-7 store the 16 high order address bits and the data bus 2-4 bits 0-15 store the 16 low order address bits. The high order and low order address bits indicate the starting address in main memory 10 through 12 which will store the first data byte transferred from disk to main memory.

For the second cycle, the data bus 2-4 bits store the range, that is the total number of bytes that main memory 10 through 14 will receive from the disk.

A function code of hexadecimal 09 specifies the first cycle of the IOLD output command and a function code of hexadecimal 0D specifies the second cycle of the IOLD output command. Also the channel number of the I/O device is specified. Command bus 2-2 signal BSWRIT specifies a bus write operation.

FIG. 6 shows the block diagram of the firmware that loads the control store 3-2 of the CSS's 3 through 5. The control store firmware is stored on either a fixed disk, a removable disk, or a floppy diskette and is transferred under SMF 20 control to main memory 10 through 12. If no errors were found after the transfer to main memory, then the control store firmware is transferred to the control store 3-2 under SMF 20 control. If both CSS's 3 and 5 require the same firmware load then both are first loaded and then both perform a validity check after receiving their respective port on line commands. If both CSS's 3 and 5 do not have the same firmware load then the control store of CSS 3 is loaded and verified and then the control store of CSS 5 is loaded and verified.

The SMF 20 has a record of the revision of the control store firmware that each CSS requires and verifies that the proper revision of the control store firmware is loaded into its CSS. One can therefore see that different CSS's may have different functionality depending on the particular revision of the control store firmware it receives. The SMF 20 stores the hardware revision number of each CSS. The hardware revision determines the firmware revision to be used to load the control store of that CSS.

Referring to FIG. 6 block 100 starts the firmware routine which is stored in the ROM of the SMF 20.

Block 101 checks if the main memory 10 through 12 has battery backup and stores that information in a location of the SMF RAM 20-44.

Block 102 stores a pointer in a register in the SMF microprocessor 20-2. The pointer is the location in the SMF RAM 20-44 which stores the control information for subsequent use. The SMF 20 then displays the words RAMWARE STARTED on the SMF display console 34, the auxiliary printer 32 and/or the remote console 42.

Block 106 checks the ports that are available. The system bus interface of each CSS has two ports. The two CSS's 3 and 5 shown in FIG. 1 would have four ports. Block 106 sends a read command to each port to send the contents of the syndrome register to the SMF 20. The present bit set in the syndrome register indicates that the CPU is available. Port 0 is identified by a channel number of hexadecimal 00, Port 1 by a channel number of hexadecimal 01, Port 2 by a channel number of hexadecimal 02 and Port 3 by a channel number of hexadecimal 03.

Block 106 also reads the hardware revision bits of the syndrome register. These bits indicate the revision to which the CSS is built. The bits are stored in the SMF RAM 20-44 for later use.

Decision block 108 determines if any ports are available and if not, aborts the operation through block 110. A message will be displayed indicating that there is a problem which requires operator intervention.

Block 112 selects the channel number of the disk which stores the control store firmware. The SMF 20 stores that channel number in a location of the SMF RAM 20-44. There is the option of using either of two channels of the CSS to receive the firmware load from main memory 10 through 12. If the first channel (port) is not available, then the attempt to load the firmware is made through the other channel (port).

Block 114 stores the main memory starting address in the SMF RAM 20-44. This is the main memory location into which the first control store firmware word received is stored. Typically the address would be hexadecimal 1000. However any address may be stored particularly if the main memory 10 through 12 has battery backup.

Block 116 sends a number of commands from the SMF to the disk or diskette controller which controls the disk storing the controls store firmware. These commands include information indicating the cylinder number, the track number, the sector number, and if the information is stored on a floppy disk, also the byte density. The firmware revision number is found by using the CSS hardware revision number from a lookup table read from the disk or diskette device. This is used to generate the path name of the firmware load stored on the device. This path name is used by the disk controller to locate the firmware load information stored on the surface of the device.

If there is main memory battery backup, the commands will call for the transfer of pages, typically 2048 bytes per page. If there is no main memory battery backup, then the commands will call for the transfer of all of the control store firmware words.

If the firmware revision number is found, then the control store firmware words will be stored in main memory 10 through 12 starting at typically address hexadecimal 1000.

If the battery backup exists then any errors would cause just the page in question to be transferred from disk. If there is no battery backup, then the whole transfer is suspect if any errors were found. The display console 34 will indicate in block 120 that the control store firmware is fully loaded into main memory 10 through 14.

Decision block 118 results in an abort via exit 110 if in block 116 the firmware with the proper revision number was not found on disk.

Block 122 sets the retry bit in a register in the SMF microprocessor 20-2 to indicate that this is the first attempt at loading the control store 3-2. Block 122 then displays on the display console 34 the channel number of all the CSS ports that are available.

Decision block 124 aborts to exit 110 if no ports are available.

Block 126 will select and display the channel number of the port of the CSS through which the control store firmware bytes are transferred from main memory 10 through 12. The order of priority is channel numbers hexadecimal 00, 02, 01, 03. This gives two paths for loading each control store.

In block 128 the SMF 20 sends a command to main memory 10 through 12 to read and clear its status and ID registers. The main memory status register is thus cleared for storing the results of further diagnostics.

Decision block 130 indicates an abort to exit 110 if the main memory status and ID registers cannot be cleared. This indicates a main memory fault which requires operator intervention.

Block 132 sets up a memory status control word which is stored in the SMF ]{RAM 20-44. The bits indicate, if a new type of memory is installed, if the memory is interleaved, whether there was an uncorrectable error in main memory 10 through 12, if this is the first pass through the firmware, whether the retry failed, and whether this is a main memory reload retry.

Block 134 starts the transfer of control store firmware bytes from main memory 10 through 12 to the control store 3-2 through the selected port. The SMF 20 first generates a command to start the load mode sequence. The SMF then generates a command which provides the starting control store address, typically hexadecimal 0000. The starting address may be any value in case just a portion of the control store is loaded.

Decision block 136 branches to retry block 177 if there is no response from the addressed CPU. If after a retry there is still no CPU response, then the firmware will branch to the next available port, that is port 0 to port 1 or port 2 to port 3.

If the CPU operation through port 0 does not respond after a retry, then a master clear is sent which shuts down that CPU clock and a retry is made through port 1.

Block 138 transfers control store bytes from main memory 10 through 12 to control store. The SMF 20 sends a read main memory command to main memory 10 through 12 which includes the CPU channel number. Therefore, during the second half bus cycle the command from main memory 10 through 12 which includes the four control store data bytes (a double word transfer) are sent to and received by the addressed CPU.

The SMF 20 waits for a predetermined time, typically 7 microseconds for the CPU to receive the double word and do any retries for a bus cycle.

The SMF 20 will receive an acknowledge signal from main memory 10 through 12 to terminate the command since the SMF 20 will not receive the data words from memory.

Normal operation is for a unit to send out a memory request command width a main memory address and its own channel number which main memory acknowledges. Main memory generates a second half bus cycle command with the contents of the addressed main memory location and the channel number of the sending unit. The receiving unit sends an acknowledge signal which is received by main memory which indicates that the data was received.

Block 140 reads the main memory status and ID registers to check for error on the main memory 10 through 12 to control store 3-2 transfer. If the main memory ID indicates an interleaved memory then the status word of each memory is examined.

Decision block 142 initiates a retry by branching to block 144 if there is no error. If there is an error, decision block 142 aborts through block 110.

The block 144 stores the error and retry bits from main memory 10 through 12 in SMF RAM 20-44.

Decision block 148 tests for a main memory uncorrectable (red) error and block 146 displays the occurrence of the red error on the display console 34.

Decision block 160 tests if the main memory reload retry bit is set and if so aborts the operation in block 168.

Block 162 sets the memory reload retry bit if it wasn't previously set.

Block 164 then reloads main memory 10 through 12 from disk as in block 116. As before if there was main memory battery back up, transfer is by block, therefore the starting main memory address is that of the previous page which was in error. If there is no battery backup then the entire control store firmware is sent from disk to main memory 10 th rough 12.

Decision block 166 again tests that the data was found on disk. If not, then block 168 causes an abort ramware load display and the firmware exits in block 259. Note that any block 110 abort exits through blocks 168 and 259.

If decision block 166 indicates that the data was found on the disk and stored in main memory 10 through 12, then block 170 displays the fact that main memory 10 through 12 is loaded. Block 133 then branches to block 134 and the operation is repeated.

If decision block 148 indicates that there was not a red error, then block 150 resets the main memory reload retry bit if set.

Decision block 152 indicates if the main memory 10 through 12 is a new style memory and if so decision block 154 tests the retry failure bit from main memory 10 through 12 which indicates if this is a retry failure to send data, then block 177 initiates a retry.

If decision block 152 indicates an old style memory which does not have a retry bit, then in block 156 the SMF 20 sends a command to read the syndrome register of the port that was used to do the loading.

Decision block 158 tests if the contents of the syndrome register was received by the SMF 20. If the contents was not received, then block 177 initiates a retry. Otherwise decision block 172 tests the syndrome register load error bit. If it is set, then block 176 displays the load error on the display console 34.

Decision block 178 starts the retry operation by testing if the retry bit in the SMF RAM 20-44 location is set. If the retry bit is not set, then block 180 sets the retry bit, block 182 displays "port retry" and block 133 branches to block 134 to repeat the loading of the control store 3-2.

If decision block 178 indicates that the retry bit is set then block 184 displays "port retry failed and is aborted" on the display console 34.

Block 186 then resets the port retry bit and block 188 sends a master clear signal to the active port to shut down its CPU.

Block 190 removes the port channel number of the failed port from the list of available ports.

Decision block 192 tests if the second port of the CSS was selected. If not, then block 194 selects the second port.

Decision block 196 tests if the second port is available. If not, the decision block 198 tests if the second CSS has a port available. If a port of the second CSS is not available, then decision block 208 tests if any port is available. If no ports are available, then block 121 causes a branch to block 122 which displays that no ports are available.

Decision block 123 tests that no ports are available, and block 110 causes an abort of the load.

If decision block 198 indicated that the second CSS had a port available, then decision block 200 tests if the port was selected. If the port had been previously selected, then block 207 selects the next lowest channel number port.

If decision block 200 indicates that the port from the second CSS was not previously selected, then block 202 selects the port of the second CSS having the lower channel number.

Decision block 204 tests if that port is available. If not, block 206 selects the other port of the second CSS.

If decision blocks 196 or 204 indicate that a port is available or if block 206 selected a port, then block 216 stores that port channel number in the SMF RAM 20-44.

If decision block 210 finds that control store 3-2 is not fully loaded, then block 212 will cause the next page of data to be read from main memory 10 through 12 and stored in the control store 3-2 if the main memory 10 through 12 had battery backup. If not, then the complete control store firmware load is read from disk and stored in main memory.

Block 214 obtains the channel number of the active port and block 216 stores the channel number in SMF RAM 20-44.

Block 218 prints the channel number of the selected port and block 133 branches to block 134 to set the CSS in load mode and store the control store starting address in counter 3-4.

If decision block 210 tests that the control stores are loaded, then block 220 sets up a work channel in the SMF RAM 20-44 to prepare for the control store verify operation.

Block 222 starts the verify operation by sending two commands, a reset load mode command having a function code of hexadecimal 0F, and a port on line command having a function code of hexadecimal 0B. The CPU reads out the control store data, checks parity and does a check sum.

Decision block 224 checks that the system bus interface acknowledged the commands. If an error response was received, then block 177 branches to block 178 for a retry operation. If no error resulted in decision block 224, then block 226 suspends further operation of the SMF 20 for 10 milliseconds to assure that the verification operation is completed by the CPU.

Block 228 sends a command to the active port to send the contents of the syndrome register to the SMF 20.

Decision block 230 tests that the contents of the syndrome register was received by the SMF 20. If the contents was received then decision block 232 tests if the busy bit is set. If the contents of the syndrome register was not received or the busy bit was set, then block 244 displays "failed verify" on the display console 34 and block 246 sends a Laster clear signal to the active port. The busy bit remains set if the verification operation was not successfully completed.

Decision block 248 tests if the error retry bit in the SMF RAM 20-44 is set. If the error retry bit is set indicating that this is the second verification failure, then block 252 resets the port available bit in the SMF RAM 20-44 and the SMF 20 looks for another port. If decision block 248 indicates that the verify error retry bit is not set, then block 250 sets it.

If decision block 232 indicates that the busy bit is not set then block 234 displays "port loaded " on the display console 34. Block 236 sets the port used bit in the SMF RAM 20-44 for later use.

Block 238 resets the channel number of the port through which the control store was successfully loaded.

Block 240 resets the first port flag stored in the SMF RAM 20-44. Decision block 242 checks if all of the port channel numbers were used. If not, then block 227 branches to block 228 to check the syndrome registers of the other ports.

If decision block 242 indicates that the port flags stored in the SMF RAM 20-44 are not all clear then block 227 branches to block 228 to read the syndrome register.

If the port flags are all clear the decision block 254 tests the SMF RAM to determine if any ports are available for retry. If a port is available for retry, then block 121 branches to block 122 to start a retry of the port requiring a retry which has the lowest channel number.

If in decision block 254 no port requires a retry; that is, all of the control stores are loaded then block 256 stores the information that the port channel number was loaded.

Decision block 258 tests the words in SMF RAM 20-44 storing the revision number of the system bus interfaces for the two CSS's. If the two revision numbers are equal then block 264 updates the console display 34 with that information which indicates that all of the control stores are loaded.

Block 266 starts the quality logic test of the CPU's, block 268 concludes the load firmware routine by placing it off-line and block 270 specifies the end of the load routine and the SMF is available for the next operation.

If decision block 258 indicates that the two revision numbers are not equal, then block 260 reads the new hardware revision number for the second CSS. Block 262 replaces the first CSS revision number with the second CSS revision number in the SMF RAM 20-44 location. Block 111 then branches to block 112 to load the control store of the second CSS with the firmware to the new revision number. CSS 3 would have its control store firmware to one revision and CSS 5 would have its control store firmware to a second revision, giving CSS 3 and CSS 5 different personalities.

Timing Diagram

FIG. 7 shows a timing diagram of the control store 3-2 load and verification operation using port 0, channel number hexadecimal 00 of system bus interface 2-10A. The timing diagram of the load and verification operation when using port 1 is similar. The only difference is that the signals P1XXXX replace signals P0XXXX in the timing diagram of FIG. 7.

The SMF 20 generates a bus clear signal BSMCLR over system bus 2 which initializes all subsystems. In particular, the trailing edge of signal BSMCLR inhibits the P0MSYN signal which in turn stalls CPU0 4-2 and CPU1 6-2 by halting the clock ring counter (not shown) in the timing generator 3-8. The CPU0 4-2 is inhibited for the load operation but activated for the verification operation since the CPU0 4-2 will verify the parity of the control store signals it receives.

The SMF 20 sends the write port command of FIG. 5B out on system bus 2 with a channel number of hexadecimal 00 and the function code of hexadecimal 0D. The channel number, hexadecimal 00, activates CNTL 0 logic 2-15 FIG. 3. Function code hexadecimal 0D generates control store load signal P0CSLD. Signal P0CSLD is applied to control store load control 3-6 which generates signals PXCSLD which controls the control store load operation and signal PXCSLV which controls the load and verify operation. Note that signals PXCSLD and PXCSLV are generated if the channel number addresses either port 0 or port 1.

The SMF 20 next sends a load address counter command in the form of FIG. 5B including the channel number, hexadecimal 00, and function code hexadecimal 11. CNTL 0 2-15 is responsive to the function code signals to generate the load address signal P0LADD and the load synchronism signal P0LSYN.

The load synchronism signal P0LSYN is applied to the timing generator 3-8 to start the control store timing ring to generate count signals CST1 through CST5. Signals PXCSLD and CST5 generate the clock signal CSACLK which is applied to counter 3-4. Signal PXLADD is generated by signal P0LADD being applied to load control 3-6. Signal PXLADD is applied to counter 3-4 to set the counter to the value of the data field of the load address command, in this example hexadecimal 0000. The SMF 20 then sends a series of commands in the form as shown in FIG. 5C to main memory 10 through 12. The address field contains the location in main memory 10 through 12 of each double word (32 bits) of control store 3-2. The data field contains the channel number of the receiving CPU port, in this example, hexadecimal 00. That is the SMF 20 generates a read memory command and the data read from main memory is sent to CPU0 4 - 2.

The second half bus cycle command includes the CPU0 4-2 channel number hexadecimal 00 in the address field and the contents of the addressed main memory location in the data field.

Signal P0LSYN starts the timing ring for each second half bus cycle. The double word received from the main memory 10 through 12 via receivers 2-30, FIFO 2-34, register 2-12, register 2-14 is stored in load register 0 4-14 at CST1 time. The write enable signals CSWE1 through CSWE4 are generated at CST4 time for writing the contents of register 4-14 into control store 3-2 at the address specified by counter 3-4. Signal CSACLK is generated at CST5 time to increment counter 3-4. Control store 3-2 is enabled by signal CSWE1 to write the first double word, CSWE2 for the second double word, CSWE3 for the third double word and CSWE4 for the fourth double word. The counter 3-4 is incremented for each second half bus cycle command for writing the next four double words into the specified control store 3-2 location.

The SMF 20 sends a reset load mode command, FIG. 5B with function code, hexadecimal 0F, and channel number, hexadecimal 00, after the control store 3-2 is fully loaded. This results in CNTL 0 2-15 resetting signal P0CSLD. This resets signal PXCSLD and generates the counter 3-4 clear signal PXACLR in load control 3-6.

The SMF 20 sends a port on line command in the form as shown in FIG. 5B, which includes the hexadecimal 00 channel number and the function code of hexadecimal 0B. This command restarts the master synch control P0MSYN and also generates clock signal CSACLK which in conjunction with signal PXACLR resets the address counter 3-4 to hexadecimal 0000.

Signal P0MSYN starts the ring counter to generate cyclic signal P0TME4 which in turn generates the signal CSACLK to increment counter 3-4. The contents of each addressed location of control store 3-2 is loaded into registers 4-12 and 3-10 until signal CSDONE is generated indicating that the entire control store 3-2 was verified.

The SMF 20 waits for ten milliseconds after sending the Port On-Line command to send a read syndrome register command. This should be enough time to successfully complete the verify operation. The read syndrome register command includes the channel number, hexadecimal 00, and the function code, hexadecimal 00. The contents of the syndrome register 2-13 is sent out on system bus 2 via registers 2-14, 2-11 and drivers 2-32. The SMF 20 examines the busy bit which is set by signal P0CSBY. If the busy bit is set then the control store load was not successfully completed. In that case the SMF 20 may repeat the load and verify operation through the same port 0 or try to load through port 1 by sending the load command with a channel number of hexadecimal 01.

Following are the Boolean equations of the signals of the preferred embodiment. As in FIG. 7 only the port 0 signals are shown as equal P0XXXX. Similar equations in the form of signal P1XXXX which apply to port 1 are not shown since it is obvious to one of ordinary skill to relate the signals of port 0 to port 1 logic.

The inhibit signal P0INHS inhibits the master sync signal P0MSYN from cycling after the trailing edge of signal BSMCLR thereby disabling the CPU 0 4-2.

P0INHS=BSMCLR

Signal P0INHS is reset by the Port on Line command having a function code of hexadecimal 0B to restart the signal P0MSYN.

P0INHS=F0CMEN.19.20.21.22.$\overline{\text{BSMCLR}}$

Signal P0CSLD is set by the load mode command having the function code of hexadecimal 0D

P0CSLD=P0INHS.F0CMEN.19.20.21.22 where signal FOCMEN indicates an acknowledged SMF cycle to channel number hexadecimal 00 with address signal 18 and signal BSRINT.

Signal P0CSLD is reset by the reset load mode command having a function code of hexadecimal 0F

P0CSLD = F0CMEN (19 + 20 + 21 + 22)

PXCSLD = P0CSLD + P1CSLD

Signal P0LADD is set by the load address command having the function code of hexadecimal 11.

P0LADD=F0CMEN.19.20.21.22

Signal P0LADD is reset at the end of the system bus 2 cycle.

Signal P0LSYN is also set by the function code hexadecimal 11 and cycles each system bus 2 read SHBC command for which the load mode signal P0CSLD is set.

P0LSYN=P0CSLD.P0INHS.F0CMEN.19.20.21.22+P0CSLD.P0INHS.$\overline{\text{F0CMEN}}$.DOSHBA When signal DOSHBA is set for each FIFO 2-34 cycle which receives the channel number hexadecimal 00 for a SHBC command.

Signal PXCSLV is set for both the load and verify operations and reset by reset signal P0CSRT.

PXCSLV=P0CSLD+PXCSLV.$\overline{\text{P0CSRT}}$.$\overline{\text{PXMCLR}}$

Signal CSACLK is cycled during the load mode as follows.

CSACLK=PXCSLD.CST5

During the verify mode

CSACLK=$\overline{\text{PXCSLD}}$.P0TME4.PT0SEL.

Signal PT0SEL is the CPU0 4-2 select signal.
Signal CSACLK is inhibited at the end of the verify signal by the signal CSDONE.
Signal PXACLR enables the resetting of the address counter 3-4 at the start of the verify mode.

PXACLR=$\overline{\text{P0CSVF}}$.P0CSRT.PXCSLD.PXCSL-V.PXMCLR

Signal PXACLR is reset by signal P0CSVF which sets as follows. Signal PXMCLR performs the master clear function.

P0CSVF=CSACLK.PT0SEL.PX-ACLR.$\overline{\text{P0CSRT}}$.PXMCLR

PT0SEL=PXMCLR+P0CSLD.$\overline{\text{PXCSLV}}$+PT-0SEL.PXCSL V

Signal P0CSRT resets signal P0CSVF.
Reset signal
P0CSRT=P0TME4.PT-0SEL.PXCF.$\overline{\text{PXLDSR}}$.$\overline{\text{PXVFER}}$.CSDONE.

Signal PXLDER indicates a load error and signal PXVFER indicates a verify error.

The busy signal P0CSBY indicates that port 0 is performing a function and is not available to system bus 2 commands.

P0CSBY=PXCSLV+P0INHS

If reset signal P0CSRT does not set indicating a load or verify error, then signal PXCSLV remains set. Therefore the busy signal P0CSBY is not reset and remains in the syndrome register 2-13.

The SMF 20 sends a read syndrome register command, function code hexadecimal 00, to generate signal P0SSYE.

P0SSYE=F0SHEN.20.21.22

Signal P0SSYE enables the output of syndrome register 2-13.

The control store write enable signals CSWE1-4 are generated in counter 3-4.

An internal counter in counter 3-4 generates signals CSADG0 and CSADG1 (not shown) which have four states and is incremented on every SHBC command. Signal $\overline{\text{PXLDER}}$ indicates that no load error was detected.

CSWE1=PXCSLD.$\overline{\text{PXLADD}}$.$\overline{\text{CSA0G0}}$.-$\overline{\text{CSADG1}}$.CST4.$\overline{\text{PXLDER}}$ CSWE2=PXCSLD.$\overline{\text{PXCADD}}$.$\overline{\text{CSADG0}}$.-$\overline{\text{CSADG1}}$.CST4.$\overline{\text{PXLDER}}$ CSWE3=PXCSLD.$\overline{\text{PXLADD}}$.CSADG0.-$\overline{\text{CSADG1}}$.CST4.$\overline{\text{PXLDER}}$ CSWE4=$\overline{\text{PXCSLD}}$.PXCADD.CSADG0.-$\overline{\text{CSADG1}}$.CST4.$\overline{\text{PXLDER}}$ While the invention has been particularly shown and described with reference to a preferred embodiment thereof, it will be understood by those skilled in the art that the foregoing and other changes in form and details may be made therein without departing from the spirit and scope of the invention.

Having described the invention, what is claimed as new and novel for which it is desired to secure Letters Patent is:

We claim:

1. A data processing system comprising:
a system bus;
a first subsystem coupled to said system bus for generating and transmitting over said bus a first command and a second command, both requiring a response command;
a second subsystem coupled to said system bus for receiving said first and said second commands and generating a response command;
a plurality of third subsystems coupled to said bus;
each one of said first and third subsystems monitoring communications broadcast on said bus and responsive to a command field identifying said one subsystem for accepting the communication broadcast on said bus;
said first command including a first field identifying said first subsystem, a second field identifying said second subsystem and a third field specifying the action said second subsystem is to perform, said second subsystem generating and broadcasting over said bus a first response command including a fourth field identifying said first subsystem; and
said second command including a first field identifying on of said third subsystems, a second field identifying said second subsystem and a third field specifying the action said second subsystem is to perform, said second subsystem generating and broadcasting over said bus a second response command including a fourth field identifying said one third subsystem.

2. The system of claim 1 wherein said first subsystem receives an acknowledge signal from said second subsystem when said second subsystem receives said first or said second commands.

3. The system of claim 2 wherein said first subsystem includes time calculation means for verifying that said first response command is received by said first subsystem within a predetermined time interval calculated from generation of said first command if said first field identifies said first subsystem.

4. The system of claim 3 wherein said time calculation means is disabled by said acknowledge signal from said second subsystem when said second command is sent by said first subsystem.

5. A data processing system comprising:
a system bus;
a first subsystem coupled to said system bus for generating and transmitting over said bus a command requiring a response command;
a second subsystem coupled to said system bus for receiving said command and generating and broadcasting over said bus said response command;
said command including a first field identifying a certain third subsystem of a plurality of third subsystems, a second field identifying said second subsystem and a third field specifying the action said second subsystem is to perform;
said response command including a field identifying the third subsystem identified by said first field;
said third subsystems coupled to said system bus, each one of said third subsystems monitoring communications broadcast on said bus and responsive to a command field identifying said one subsystem for accepting the communication broadcast on said bus, the one of said subsystems identified by said field in said response command receiving said response command.

6. The system of claim 5 wherein said first subsystem receives an acknowledge signal from said second subsystem when said second subsystem receives said command.

7. The subsystem of claim 6 wherein said first subsystem includes time calculation means for verifying that said response command is received by said first subsystem within a predetermined time interval calculated from generation of said command of said first subsystem if said first field identifies said first subsystem, said time calculation means being responsive to said acknowledge signal for disabling said time calculation means when said first field identifies said certain third subsystem.

8. A data processing system comprising:
a system bus;
management means coupled to said system bus for generating and transmitting over said system bus a memory reference command including a first and a second control signal, a channel number and a memory address;
memory means coupled to said system bus and responsive to said first and said second control signals for reading the contents of a memory location specified by said memory address and generating and broadcasting over said system bus a second half bus cycle command including said channel number and the contents of said memory location; and
plurality of subsystem means coupled to said system bus, each one of said subsystem means monitoring communications broadcast on said bus and responsive to a channel number identifying said one subsystem means for accepting the communication broadcast on said bus, the one of said subsystem means identified by the channel number of said second half bus cycle command receiving said second half bus cycle command and storing the contents of said memory location,
whereby the management means may request data retrieval for any certain subsystem means of the plurality of subsystem means by providing and transmitting over said bus the certain subsystem means' channel number with said control signals and said memory address,
said management means receiving an acknowledge signal from said memory means when said memory means receives said memory reference command, and
said management means including time calculation means for verifying that said second half bus cycle command is received within a predetermined time interval calculated from generation of said memory reference command if said channel number identifies said management means.

9. The system of claim 8 wherein said time calculation means is disabled by said acknowledge signal when said channel number identifies one of said subsystem means.

10. A system for facilitating transfer of information among information handling units comprising:
a) a system communications bus for transferring commands generated by information handling units connected thereto;
b) a first information handling unit operatively connected to said system communications bus, said first information handling unit being capable of generating and transmitting on said bus a request command;
c) a second information handling unit operatively connected to said system communications bus, said second information handling unit being capable of generating and broadcasting on said bus a response command in response to said request command generated by said first information handling unit;
d) a plurality of third information handling units coupled to said bus; each one of said third information handling units monitoring communications broadcast on said bus and responsive to a response command identifying said one third information handling unit for accepting the communication broadcast on said bus;
e) time calculation means operatively connected to said first information handling unit for determining the interval of time between the generation of said request command and an acknowledgement of reception thereof; and
f) disabling means operatively connected to said time calculation means for the disabling thereof when said first information handling unit transfers said request command to said second information handling unit for eventual reception of said response command by said third information handling unit.

* * * * *